US006243072B1

(12) United States Patent
McKnight

(10) Patent No.: US 6,243,072 B1
(45) Date of Patent: Jun. 5, 2001

(54) METHOD OR APPARATUS FOR DISPLAYING GREYSCALE OR COLOR IMAGES FROM BINARY IMAGES

(75) Inventor: Douglas J. McKnight, Boulder, CO (US)

(73) Assignee: Regents of the University of Colorado, Boulder, CO (US)

( * ) Notice: Subject to any disclaimer, the term of this patent is extended or adjusted under 35 U.S.C. 154(b) by 0 days.

(21) Appl. No.: 08/949,692

(22) Filed: Oct. 15, 1997

Related U.S. Application Data

(63) Continuation of application No. 08/505,654, filed on Jul. 20, 1995, now Pat. No. 5,767,828.

(51) Int. Cl.$^7$ ................................................... G09G 3/36
(52) U.S. Cl. ............................. 345/148; 345/84; 345/87; 345/89; 345/147
(58) Field of Search ......................... 345/148, 89, 147, 345/87, 84, 54, 94, 88

(56) References Cited

U.S. PATENT DOCUMENTS

| | | | |
|---|---|---|---|
| 4,870,396 | 9/1989 | Shields et al. | 340/719 |
| 5,023,718 | 6/1991 | Solett | 348/715 |
| 5,081,450 | 1/1992 | Lucas et al. | 345/202 |
| 5,122,784 | 6/1992 | Canova | 345/155 |
| 5,122,791 | 6/1992 | Gibbons et al. | 340/784 |
| 5,194,974 | 3/1993 | Hamada et al. | 359/59 |
| 5,206,629 | 4/1993 | DeMond et al. | 340/719 |
| 5,214,420 | 5/1993 | Thompson et al. | 340/795 |
| 5,278,652 | 1/1994 | Urbanus et al. | 348/571 |
| 5,325,106 | 6/1994 | Bahraman | 345/56 |
| 5,349,366 | 9/1994 | Yamazki et al. | 345/92 |
| 5,467,146 | 11/1995 | Huang et al. | 348/743 |
| 5,469,190 | 11/1995 | Masterson | 345/155 |
| 5,506,597 | 4/1996 | Thompson et al. | 345/85 |
| 5,506,598 | 4/1996 | Shimada et al. | 345/92 |
| 5,541,618 * | 7/1996 | Shinoda | 345/60 |
| 5,566,010 | 10/1996 | Ishii et al. | 358/59 |
| 5,581,273 | 12/1996 | Yoneda et al. | 345/90 |
| 5,627,557 | 5/1997 | Yamaguchi et al. | 345/90 |
| 5,652,600 * | 7/1997 | Khormaei et al. | 34/76 |
| 5,657,043 * | 8/1997 | Fukui et al. | 345/100 |
| 5,666,130 | 9/1997 | Williams et al. | 345/90 |
| 5,757,348 * | 5/1998 | Handschy et al. | 345/89 |
| 5,757,351 * | 5/1998 | Lin et al. | 345/98 |
| 5,764,211 * | 6/1998 | Tagawa et al. | 345/97 |
| 5,767,828 * | 6/1998 | McKnight | 345/89 |
| 5,777,591 | 7/1998 | Katoh et al. | 345/92 |
| 5,790,213 | 8/1998 | Sasaki et al. | 349/48 |
| 5,844,538 | 12/1998 | Shiraki et al. | 345/98 |

FOREIGN PATENT DOCUMENTS

| | | | |
|---|---|---|---|
| 0 444 962 A2 | 1/1991 | (EP) | G09G/3/28 |
| 0 662 773 A1 | 5/1995 | (EP) | H04N/9/31 |

OTHER PUBLICATIONS

Radcliffe, S., et al., "Miniature Silicon Backplane Ferroelectric Liquid Crystal Displays For Head Mounted Display Applications," *Ferroelectrics*, vol. 179, pp. 115–119, 1996.
Mercier B. et al., "A New Video Storage Architecture for Plasma Display Panels", 1EEE Transactions on Consumer Electronics, vol. 42, No. 1, Feb. 1, 1996, pp. 121–127.

* cited by examiner

*Primary Examiner*—William A. Cuchlinski, Jr.
*Assistant Examiner*—Marthe Y. Marc-Coleman
(74) *Attorney, Agent, or Firm*—Fleshner & Kim, LLP

(57) ABSTRACT

An apparatus and method for improving image quality and in particular to an apparatus and method for converting binary images to grey-scale or color images and displaying those images. The apparatus and method utilize the natural process of integration which occurs when a person views images at sufficiently high rates and involves identifying least significant subframes within a group of subframes and reducing the intensity of those subframes or extending the duration of subframes other than the least significant subframes.

30 Claims, 23 Drawing Sheets

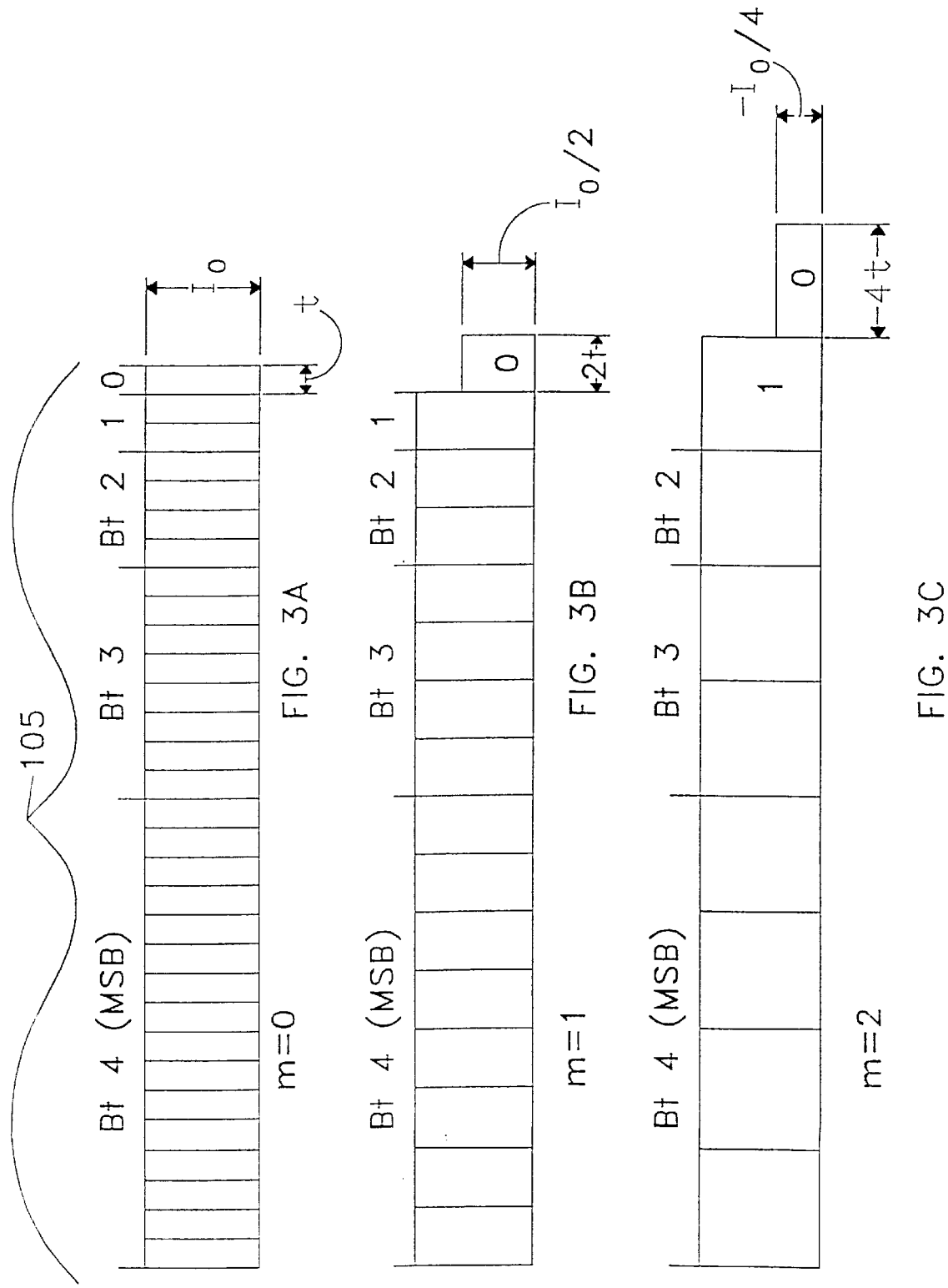

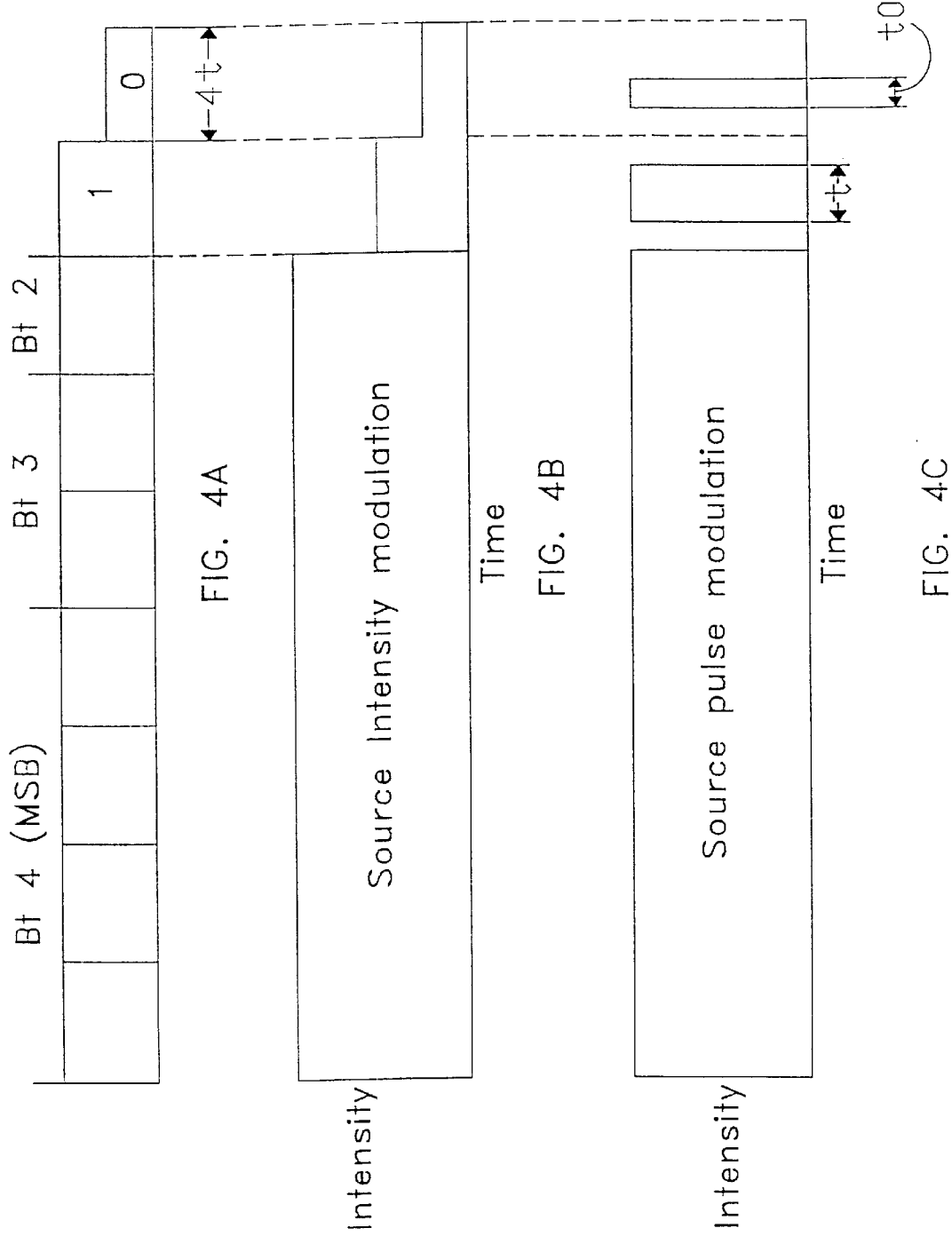

METHOD OR APPARATUS FOR DISPLAYING GREYSCALE OR COLOR IMAGES FROM BINARY IMAGES

This application is a continuation of application Ser. No. 08/505,654 filed Jul. 20, 1995, U.S. Pat. No. 5,767,828.

BACKGROUND OF THE INVENTION

1. Field of the Invention

This invention relates generally to an apparatus and method for improving image quality and in particular to an apparatus and method for converting binary images to grey-scale or color images and displaying those images.

2. Background of the Related Art

It has been known that when a person views a rapidly cycled through sequence of binary images, the person may, if the rate and duration of images is proper, temporally integrate such that that sequence of binary images and the sequence in turn appears to be grey-scale images. This integration phenomenon is of particular interest with the arrival of high speed binary displays. Such devices are used, for example, in projection display systems, head-up displays and head mounted displays. There exist small fast high resolution displays which are essentially binary in nature such as the Digital Mirror Device (DMD), made by Texas Instruments, as well as actively addressed ferroelectric liquid crystal devices. These technologies are both capable of producing many thousands of binary images per second, depending on the number of pixels per frame, etc. . . . .

FIG. 1A shows a series of binary images 105 which could be viewed by a person in the manner described above. Each frame F1–Fm will be comprised of a series of bits that are either 1 (ON) or 0 (OFF). That is, the series F1–Fm of frames as well as each individual frame is actually a series of bits which must eventually be displayed in order to make it possible for the person viewing the binary images to perform the integration discussed above. FIG. 1A further shows pixels Pj in general, and P1–P4, in particular, as representative pixels. As each frame F1–Fm is displayed for a time t, some of the pixels Pj will be a logical 1 and some will be a logical 0. In order for a person to view images produced by frames F1–Fm, a display device is required.

A problem with the above approach is that a display device which displays the group of binary images 105 must be capable of responding in the time t (which relates to the frame rate 1/t). This places a limitation on which displays can be used. Namely, only those display devices can be used which have response rates at least as great as 1/t Hz or frames per second. However, the integration process requires that t be small, otherwise the display would appear to flicker and not appear to provide a grey-scale.

Currently, there are a variety of display devices which might be used to output the above discussed subframes. Liquid crystal on silicon (LCOS) devices which have been designed as displays (or spatial light modulators) have used pixel designs which can be categorized as being either "dynamic" or "static". A static pixel design has a memory element at each pixel, which can store the pixel data indefinitely without the need for periodic refresh cycles. This is analogous to SRAM (static random access memory) in computer memory. A dynamic pixel stores data capacitively and requires a periodic refresh to compensate for leakage of the stored charge, analogous to DRAM (dynamic random access memory).

Both of these types of displays share the property that as the array of pixels is addressed in sequence, row-at-a-time, the liquid crystal begins to update to the new data immediately once the row is addressed. It happens that a reasonably high resolution displays, such as 1024 by 1024 pixels, the electronic refresh time is comparable or longer than the liquid crystal switching time. For example, if data is supplied to the display through 32 data wires running at 50M bits/sec, such an array of pixels takes approximately 690 microseconds to update. The liquid crystal switches in approximately 100 microseconds. It is valid, therefore, to view the display as being updated in a sweeping motion across its area.

Some applications require that the data on all of the display be simultaneously valid before it can be usefully viewed. Examples of such applications include most coherent applications such as optical correlators, optical beam steerers etc. . . . , and display applications where precise synchronization with other parts of the system, such as an illuminated source, is required.

SUMMARY OF THE INVENTION

An object, therefore, of the invention is to improve image quality from binary display devices.

Another object of the invention is to provide a method of achieving grey-scale images produced using binary display devices.

Another object of the invention is to provide a method and apparatus for reducing the data rate requirement for generation of time sequential grey-scale images on a display device.

Another object of the invention is to provide a method and apparatus for displaying subframes to allow a person to perform temporal integration of the stream of images.

One advantage of the invention is that it makes it possible to observe grey-scale images using a binary display device.

Another advantage of the invention is that it can be used to produce colored grey-scale images.

Another advantage of the invention is that it can utilize liquid crystal display devices.

Another advantage of the invention is that it significantly reduces the time interval during which the displayed data is changing by avoiding the row by row updating of the pixels.

Another advantage of the invention is that it is only limited by the switching time of the pixels.

Another advantage of the invention is that it can be used with static as well as dynamic type display systems.

One feature of the invention is that it provides grey-scale images by rapidly cycling through a sequence of binary images or subframes.

Another feature of the invention is that in one embodiment the ON pixels in the least significant frame is displayed at approximately half their full duration but no change in their output or ON intensity.

Another feature is that the non-attenuated subframes are grouped together to reduce the rate at which the display device outputs subframes.

Another feature of the invention is that in another embodiment the ON pixels in the least significant frame is displayed at approximately half their full or ON intensity.

Another feature of the invention is that it can utilize pixel buffers or a frame/image buffer.

These and other objects advantages and features are achieved by the provision of a method for displaying a grey-scale image on a display unit with a plurality of pixels, comprising the steps of: receiving a group of subframes to be displayed at a first rate; attenuating the least significant subframes within the group of subframes to yield attenuated subframes; combining unattenuated subframes to yield fewer unattenuated subframes; increasing the duration of the attenuated subframes; and displaying the unattenuated subframes and the attenuated subframes at a correspondingly reduced rate to achieve visual integration.

These and other objects, advantages and features are also achieved by the provision of a method for displaying a grey-scale image on a display unit with a plurality of pixels, comprising the steps of: receiving a group of subframes to be displayed at a first rate; attenuating the intensity of pixels of least significant subframes within the group of subframes to yield a series of attenuated subframes, the series including one or more of the subframes; combining pairs of unattenuated subframes to yield a shorter series of unattenuated subframes; increasing the duration of the series of attenuated subframes; and displaying the series of unattenuated subframes and the series of attenuated subframes at a rate sufficiently high to achieve visual integration.

These and other objects, advantages and features are also achieved by the provision of a method for displaying a grey-scale image on a display unit with a plurality of pixels, comprising the steps of: receiving a group of subframes to be displayed at a first rate; combining subframes other than the least significant bit subframes to yield a reduced number of subframes; and displaying the reduced number of subframes and the least significant subframes at a correspondingly reduced rate to achieve visual integration.

The above and other objects, advantages and features are achieved by a display device comprising: a substrate having a first surface; a plurality of liquid crystal driving electrodes arranged on said first surface of the substrate; an integrated circuit integrated into said substrate for receiving image data comprised of a series of subframes, including a plurality of storage elements respectively coupled to said plurality of liquid crystal driving electrodes, for storing said image data; a liquid crystal layer arranged on said first surface; and a window arranged on said liquid crystal layer, wherein said plurality of storage elements approximately simultaneously output said image data to said liquid crystal driving electrodes which drive said liquid crystal layer to yield an image.

The above and other objects, advantages and features are also achieved by the provision of a display device comprising: a substrate having a first surface; an array of liquid crystal driving electrodes arranged on the first surface of the substrate; an integrated circuit integrated into the substrate for receiving image data comprised of a series of subframes, including an array of storage elements respectively coupled to the array of liquid crystal driving electrodes, for storing the image data; a liquid crystal layer arranged on the first surface; and a window arranged on the liquid crystal layer, wherein the array of storage elements approximately simultaneously outputs the image data to the array of liquid crystal driving electrodes which drive the liquid crystal layer to yield an image.

The above and other objects, advantages and features are accomplished by the provision of a method for making a display device, comprising the steps of: integrating an integrated circuit into a substrate for receiving and storing image data comprised of a series of subframes, wherein the integrating step includes integrating a plurality of storage elements in the substrate for storing the image data; arranging a plurality of liquid crystal driving electrodes on the first surface of the substrate, wherein the plurality of liquid driving electrodes are respectively coupled to the plurality of storage elements; applying a liquid crystal layer to the first surface of the substrate; and arranging a window on the liquid crystal layer, wherein the image data may include a plurality of subframes which are collectively stored as the image data and the image data is displayed only after a sufficient number of such subframes have been received.

These and other objects, advantages and features are also achieved by the provision of a method for displaying a grey-scale image on a display unit with a plurality of pixels, comprising the steps of: receiving a series of N frames of binary images to be displayed at a rate of approximately 1/t; arranging the series of N frames of binary images into n groups of m binary subframes, where m is less than or equal to N; attenuating the output of the least significant subframes within each of the N groups of subframes; combining pairs of subframes within each of the n groups of m subframes to yield a series of unattenuated subframes; doubling the duration of the display of the least significant subframes; and displaying the series of unattenuated subframes and the least significant subframes at a reduced rate of approximately 1/(2t).

These and other objects, advantages and features are also achieved by a method for displaying a grey-scale image on a display unit with a plurality of pixels, comprising the steps of: receiving a series of N frames of binary images to be displayed at a rate of approximately 1/t; arranging the series of N frames of binary images into n groups of m binary subframes, where m is less than or equal to N; combining pairs of subframes other than least significant subframes within each of the n groups of m subframes to yield a series of combined subframes; and displaying the series of combined subframes and said least significant subframes at a reduced rate of approximately 1(2t).

BRIEF DESCRIPTION OF THE DRAWINGS

FIGS. 3A, FIGS. 3B, and 3C show an approach for rearranging the frames such that the display system is not required to run at a rate 1/t in order to display the least significant bit (LSB) frame.

FIGS. 4A, 4B and 4C show another approach achieve a grey-scale effect for the case where m'=2 (corresponding to FIG. 3C) with a frame rate of approximately 1/(4t).

DETAILED DESCRIPTION OF PREFERRED EMBODIMENTS

Figure 1A:
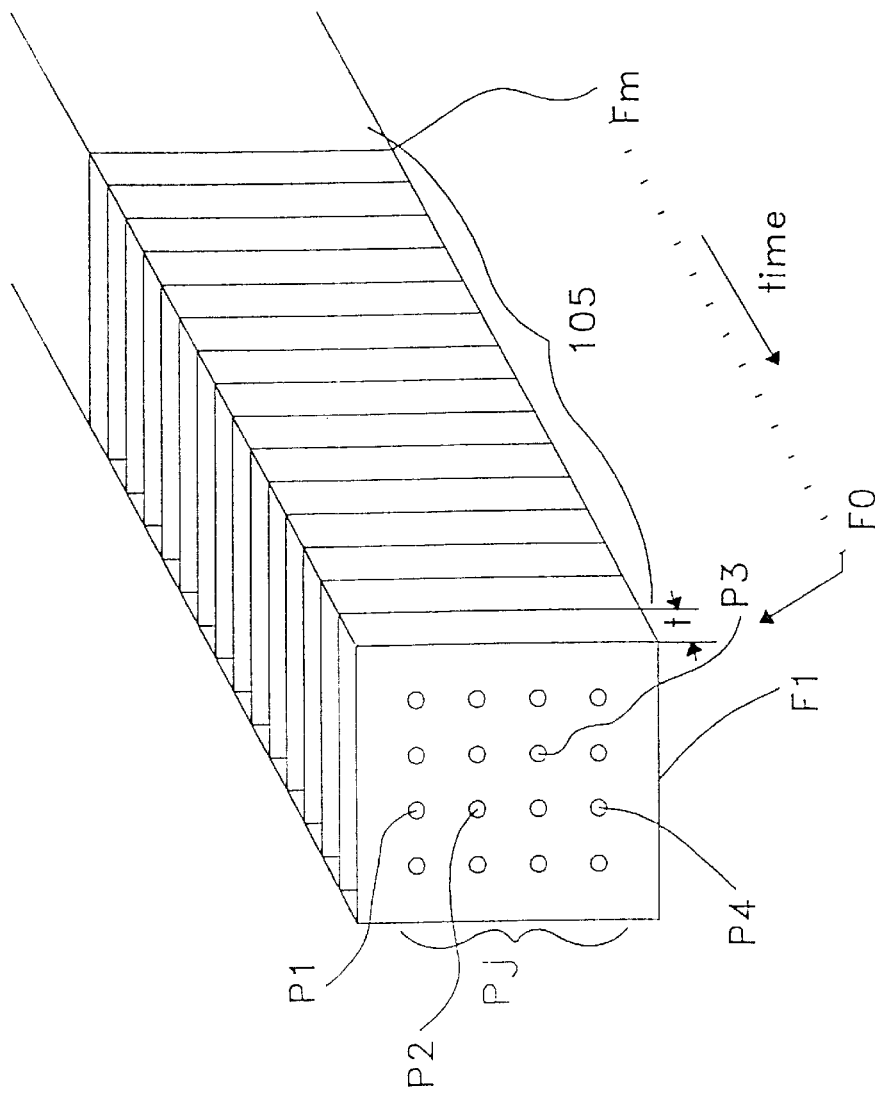
FIG. 1A shows a series of binary images which could be viewed by a person in the manner described above.
Figure 1B:
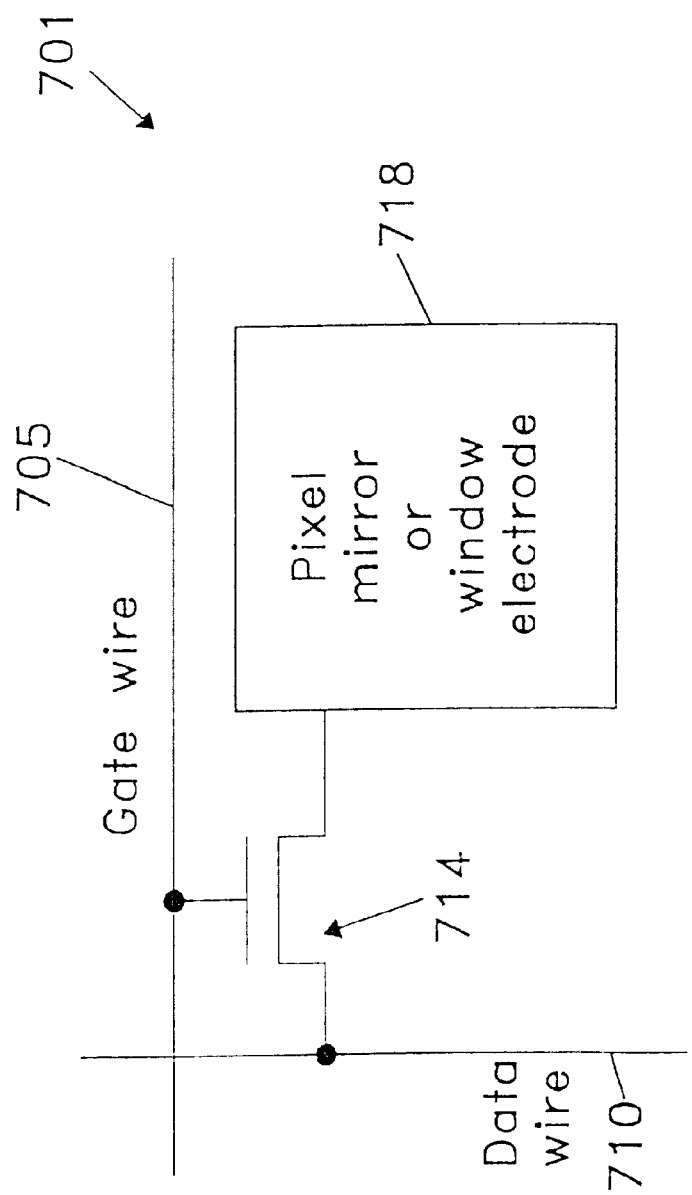
FIG. 1B shows schematically the same sequence of binary images shown in FIG. 1A as they are input to a binary display device.

FIG. 1B shows schematically the same sequence of binary images 105 shown in FIG. 1A as they are input to a binary display device 115 which has hardware pixels Hj which are either on or off (bright or dark) corresponding to the respective values Pj in frames F1–Fm. Note that although a 4 by 4 pixel display and images are depicted, the following discussion applies to any display and frame size.

Suppose P1 is 1 (ON) for every frame F1 through Fm, P2 is 1 (ON) for frames F1 through Fm−1 and is 0 (OFF) for frame Fm, P3 is 1 ON only for frames F1 and F2 and 0 (OFF) for frames F3–Fm, and P4 is 1 (ON) only for frame F1 and 0 (OFF) for frames F2–Fm.

The rate at which the frames are displayed by display device 115 is 1/t Hz, where t is the time between any two consecutive frames Fj and Fj+1. Since P1 is ON for all frames, pixel H1 remains ON for a time mt. Since P2 is ON for frames F1 to (Fm−1), H2 is ON for a time (m−1)t. Since P3 is ON only for frames F1 and F2, H3 is ON for a time 2t. Since P4 is ON only for frame F1, H4 is ON only for a time t. Integration is achieved as follows. If display device 115 has a quick enough response rate, a person viewing it notices that pixel H4 is slightly brighter than those pixels which were not ON at all, i.e., all pixels Pj other than P1 to P4. Similarly, pixel H3 appears slightly brighter than pixel H4 since it is ON for 2t rather than t. Similarly, H1 appears brighter than H2 because it is ON for a time mt whereas H2 is ON for a shorter time (m−1)t.

In all of the above statements, it is assumed that the time t is short enough that a person would not actually see or notice that H4 is ON for time t and then Off for the rest of the time (m−1)t, whereas H1 is ON for the entire time mt. Instead, the viewer would integrate the images together which means that to the viewer both H1 and H4 appear to be ON, but H1 is much brighter than H4.

Figure 1C:
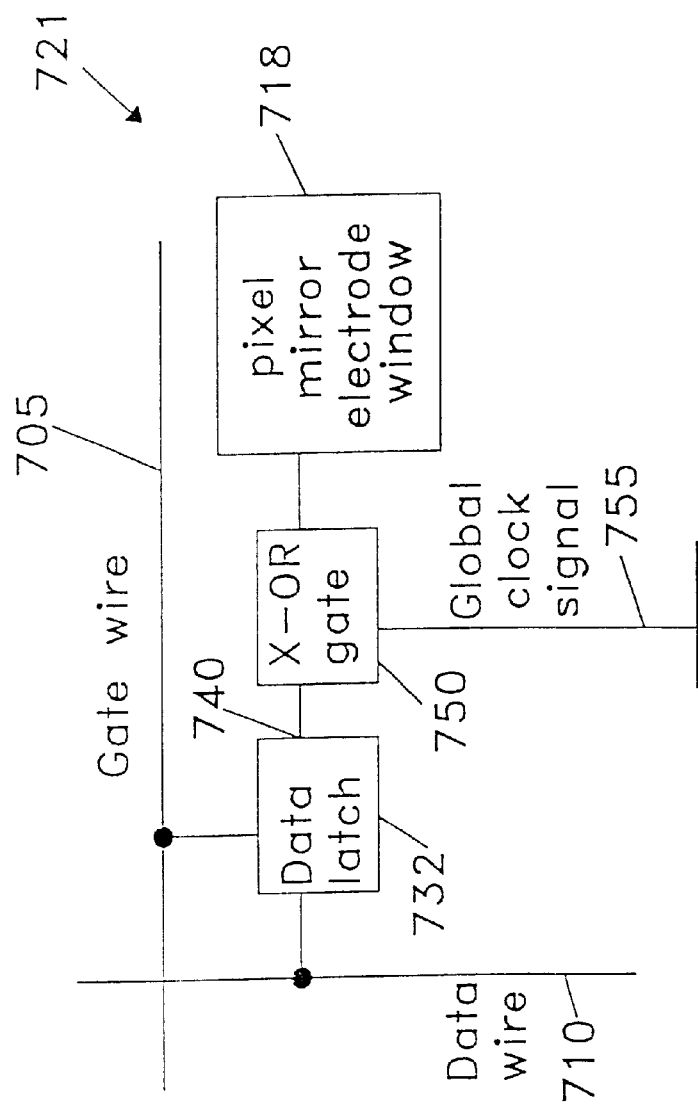
FIG. 1C shows a series of groups of m frames.

FIG. 1C shows a series of groups 105 of m subframes. Here, the total number of subframes being viewed is N, and again the rate at which each frame is updated is 1/t where t is the time between frames. Each group 105 is integrated by the human eye of the observer viewing device 115 so as to appear as a series 155 of grey-scale images 105' each corresponding to the group of images 105 after integration. Here, m subframes are required to form a single grey-scale (or color) image or frame and N subframes form a sequence of grey-scale (or color) images.

Figure 1D:
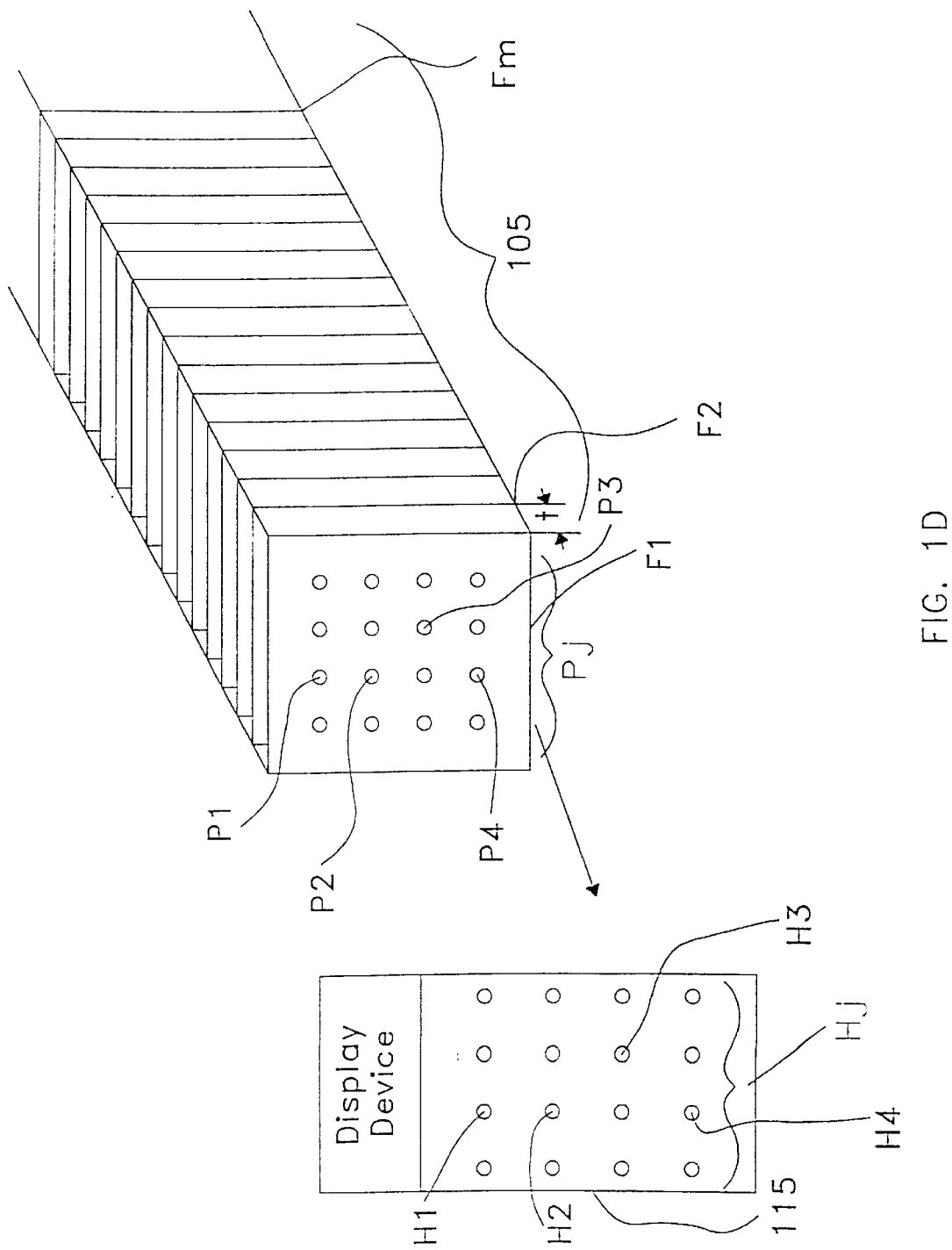
FIG. 1D provides a brief demonstration of the integration process.

FIG. 1D provides a brief demonstration of the integration phenomenon. In particular, FIG. 1D shows intensity output by H1–H4 of I(P1), I(P2), I(P3) and I(P4) versus time for four points P1–P4 under a hypothetical situation. The number of subframes is m. The following discussion relates to the first group 105 of subframes. Pixel H1 is ON for the entire m subframes, H2 is ON during the third sub-frame and off for the remaining subframes, H3 is ON for the first and second subframes and OFF for the remaining subframes, and H4 is ON for the 5th subframe and off for the remaining subframes. If the rate 1/t is sufficient such that integration occurs in the viewers mind, then the intensity I(Pj) would appear to be as follows (intensities are relative intensities). I(P1)=(1,1, . . . , 1)→m, I(P2)=(0,0,1,0 . . . , 1)→1, I(P3)=(1,1, . . . 0,0)→2, and I(P4)=(0,0,0,0,1, . . . 0,0)→1. Note that the peak intensity is represented by the time sequence (1,1 . . . , 1) (the lowest intensity is (0, . . . , 0)). Also, note that the intensity at point P2 will appear (if properly integrated) to be the same as the intensity at point P4 and their order of occurrence is not noticeable. Consequently, the subframes can be interchanged within a group 105 and provide the same grey-scale image to an observer when properly integrated by the observer, and indeed the correct distribution of subframes may aid the process of integration.

Figure 1E:
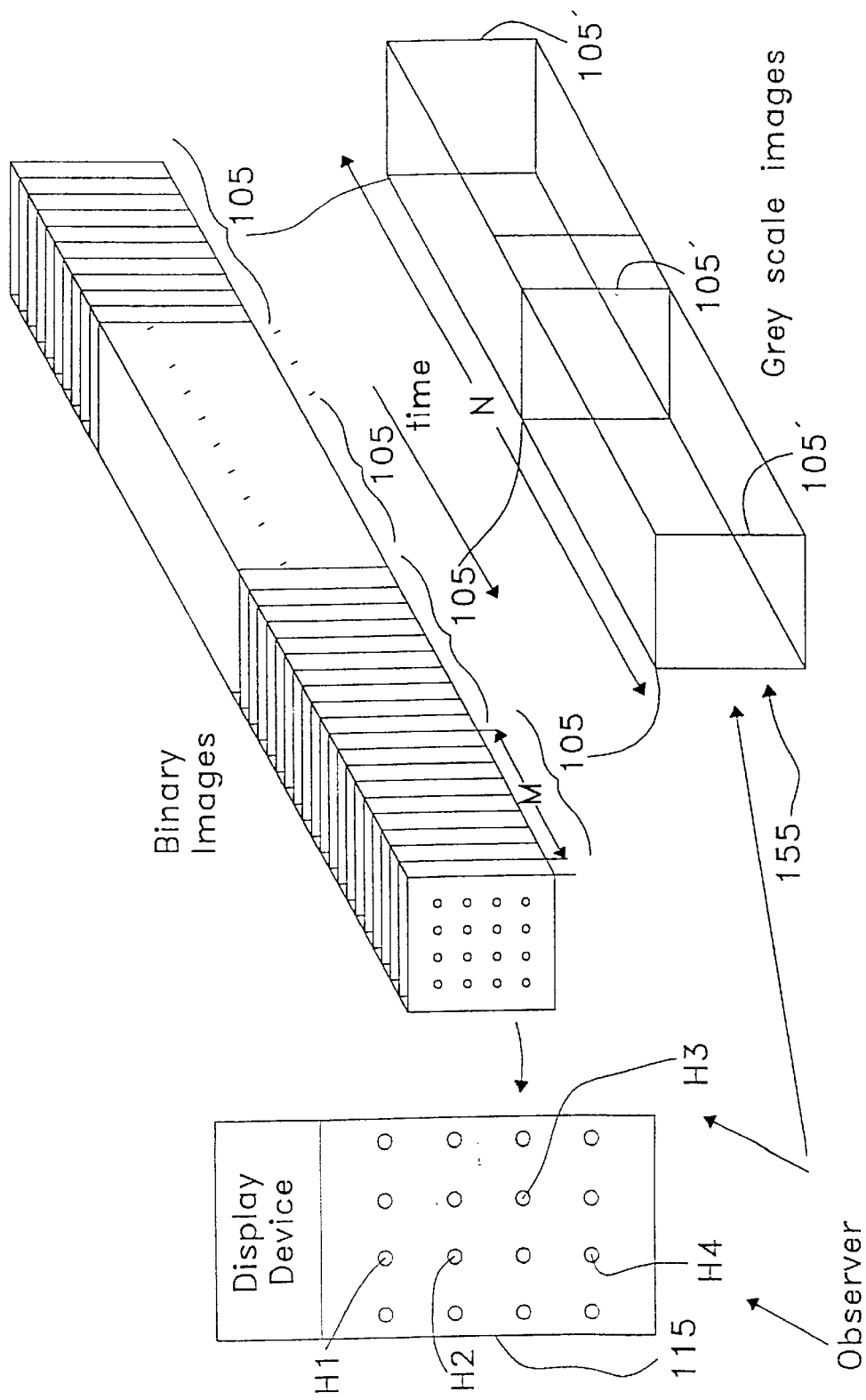
FIG. 1E shows an example of how a series of binary images which will be arranged into "bit plane" binary subframes which in turn can be displayed to appear to a viewer to be an pixel image with a 4 bit grey-scale.
Figure 1F:
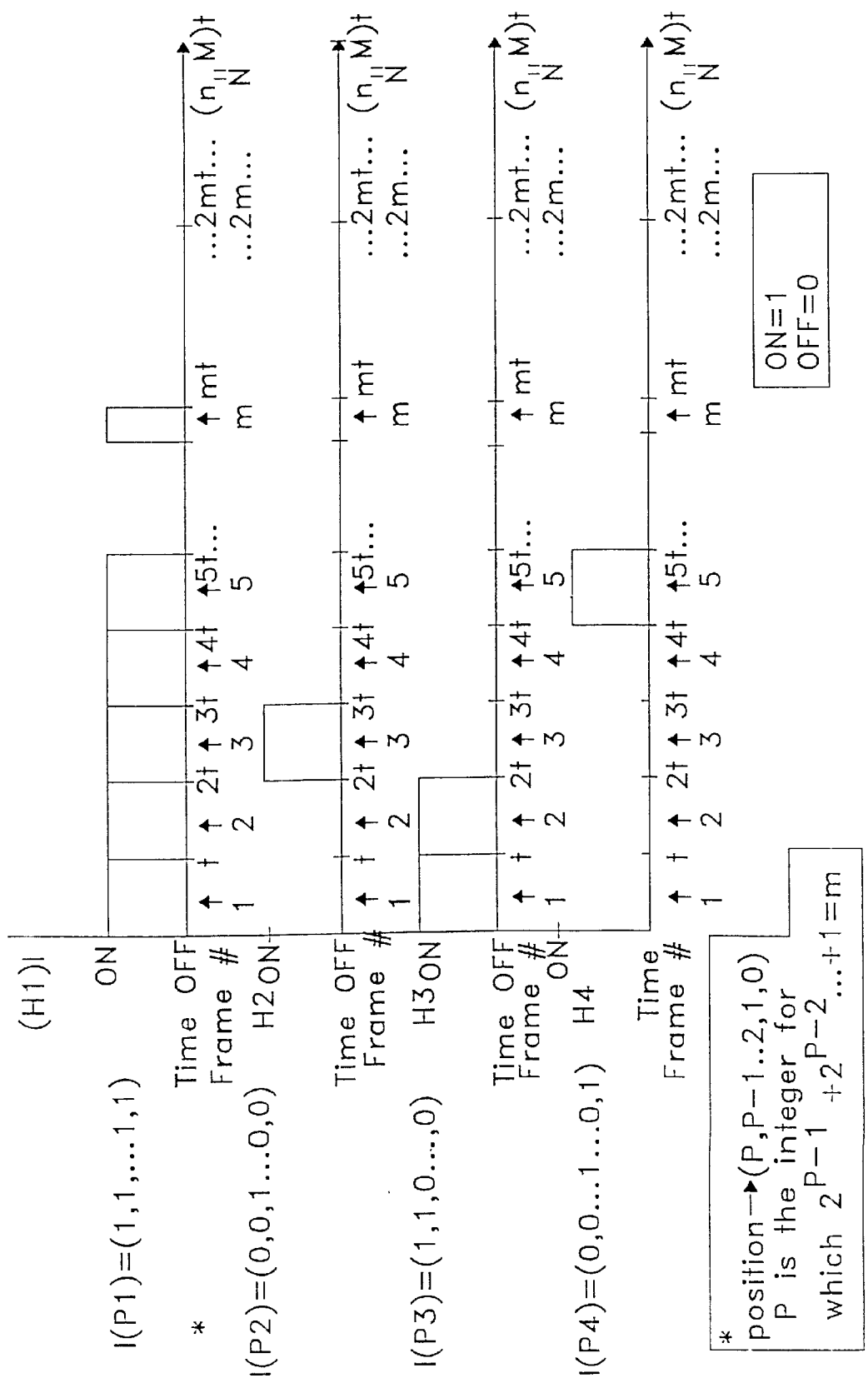
Figure 1G:
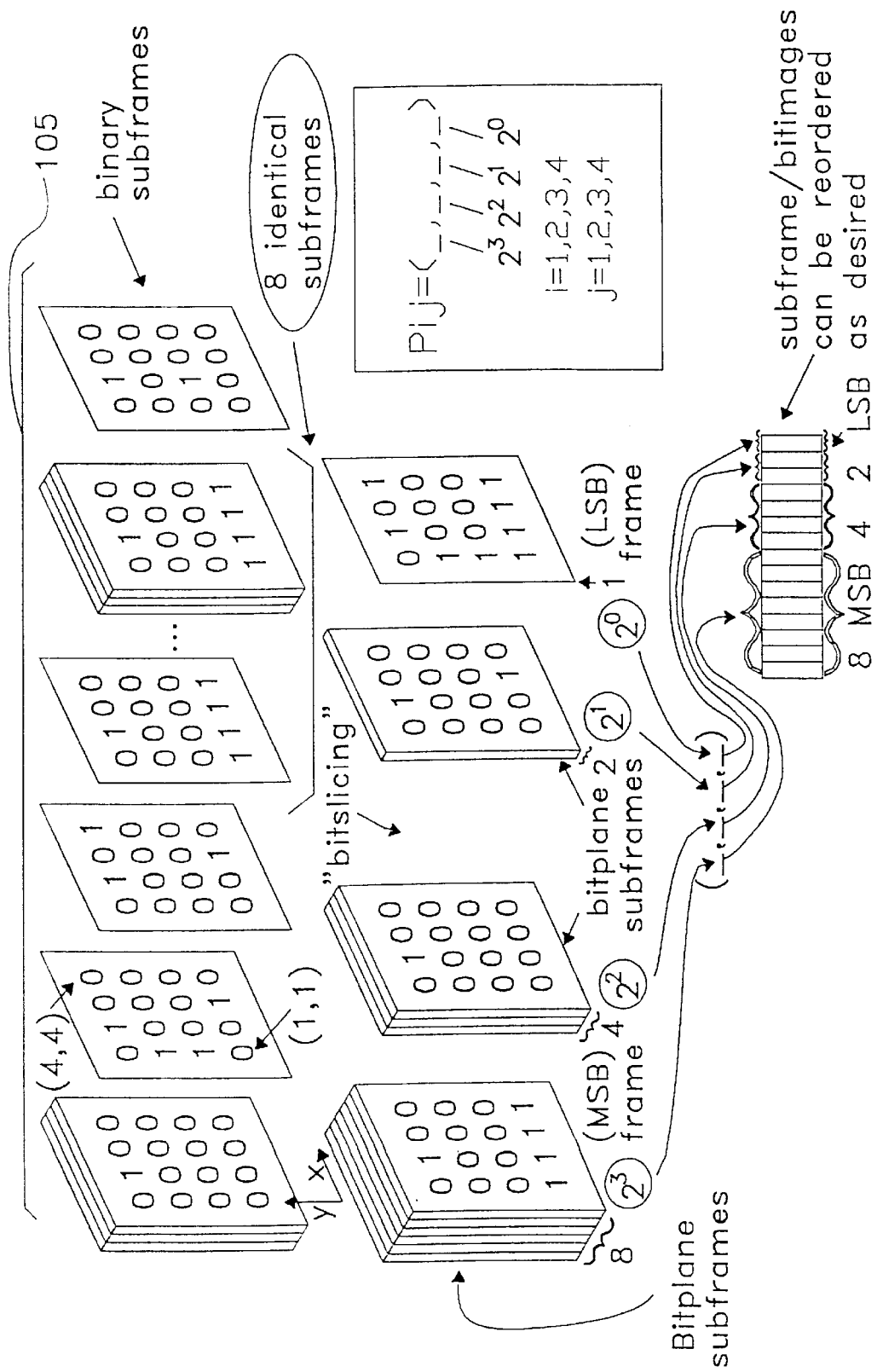

FIG. 1E shows an example of how a series of 4×4 binary images which will be arranged into "bit plane" binary subframes which in turn can be displayed to appear to a viewer to be 4×4 pixel image with a 4 bit grey-scale. Note that although FIG. 1E shows 4×4 pixel images, the transverse dimensions of the images can be any two integers. Also, these transverse dimensions just happen to be the same as the number of bits of grey-scale which also can be any integer. That is, a 4 bit grey-scale is shown for discussion and demonstration purposes only.

The group 105 of subframes shown in FIG. 1E are binary subframes where ON pixels are represented by 1 and OFF pixels are represented by 0. A total of $2^4-1=15$ such binary subframes 105 are contained in group 105 for 4 bit grey-scale images. Also, since this is a 4 bit grey-scale, there need only be 4 bit plane subframes (this number can be increased, if desired). The most significant bit (MSB) subframe shows an image with all pixels that are ON or 1 for at least 8 subframes in group 105. As can be seen, only pixels (2,4) (which (2,4) is ON in all of the subframes in group 105) and all of the pixels on the y=1 row, i.e., (1,1), (2,1), (3,1) and (4,1) (which is repeated 8 times). The next most significant bit (the $2^2$=4) or third bit rearranged into 4 sets of bit-plane subframes. Only pixel (2,4) is ON in this example for all of these bit-plane subframes. The next to the least significant subframe has two pixels ON, namely, (2,4) which is ON for all subframes as discussed above, and (3,1) which is ON for the 8 identical subframes and for 2 additional subframes within group 105.

The purpose of arranging subframes from group 105 into the so-called bit-plane subframes can be done in a wide variety of ways and is referred to here as "bit slicing". One approach is as follows. The binary data which represents the stream of binary images could be stored in a computer memory in, for example, a format where an 8-bit byte represents the grey level to be displayed by a particular pixel (in a particular color) after integration. One way of generating subframes from such a representation is to simply from a 1-bit binary bit-plane subframe from each of the bits of the 8-bit byte. This would be done in software by performing a logical AND operation between the byte representing the pixel grey level and a byte containing all the "0"s except for a single "1" in the correct position in the byte to extract the desired subframe. One hardware implementation could be to read directly the desired bit for the bit-plane subframe from the stored byte by constructing the memory hardware in such a way as to facilitate selectable bit-read operations instead of byte-read operations.

One difficulty or potential problem with the above approach is that the display device 115 must be capable of responding to the time t (which relates to the frame rate 1/t). This places a limitation on which displays can be used. Namely, only those display devices can be used which have response rates at least as great as 1/t Hz or frames per second.

The situation discussed with reference to FIG. 1A–1D can be used to produce color images with grey-scale in Red, Green and Blue as follows. Suppose that m=100, N=10,000 and t=0.1 milliseconds. These numbers would make available, in one second 100 frames or images, each comprised of 100 binary sub-frames (corresponding to frames 105 in FIG. 1A–1C) to generate one grey-scale image for one color. If a complete color image is desired, then three grey-scale images (one each for red, green and blue) would be required. In that case, approximately 32 subframes would be available for each Red, Green and Blue image if we wish to display 100 color images. These 32 subframes can be used to produce 33 equally spaced grey levels which is equivalent (approximately) to 5 bits of grey-scale for each of Red, Green and Blue. This will be discussed in more detail below.

The above phenomenon makes it possible that the subframes can be displayed in any order within a group 105. In addition, some orders of display of subframes may be advantageous over others as will be discussed below. Referring to FIGS. 1A–1D, least significant bit (LSB) subframes and most significant bit (MSB) subframes are defined as follows. A least significant bit (LSB) subframe is defined to be that subframe in which pixels may be ON for only one time t within group 105 of subframes, thus forming the least significant bit of a binary representation of a hrey-scale image, and a most significant bit (MSB) subframe is defined to be that set of $2^{p-1}$ subframes in which some or all pixels are ON within group 105 of subframes where p is defined as the integer for which the following holds: $2^{p-1}+2^{p-2}+\ldots+2^0=(2^p-1)=m$, see FIG. 2D. Hence, the LSB subframe is that single subframe in which the intensity may be On to contribute the intensity corresponding to the LSB of a grey-scale image, and the MSB subframe is that set of $2^{p-1}$ for which the intensity of a pixel may be ON to contribute the intensity corresponding to the MSB of a grey-scale image.

Figures 2A, 2B:
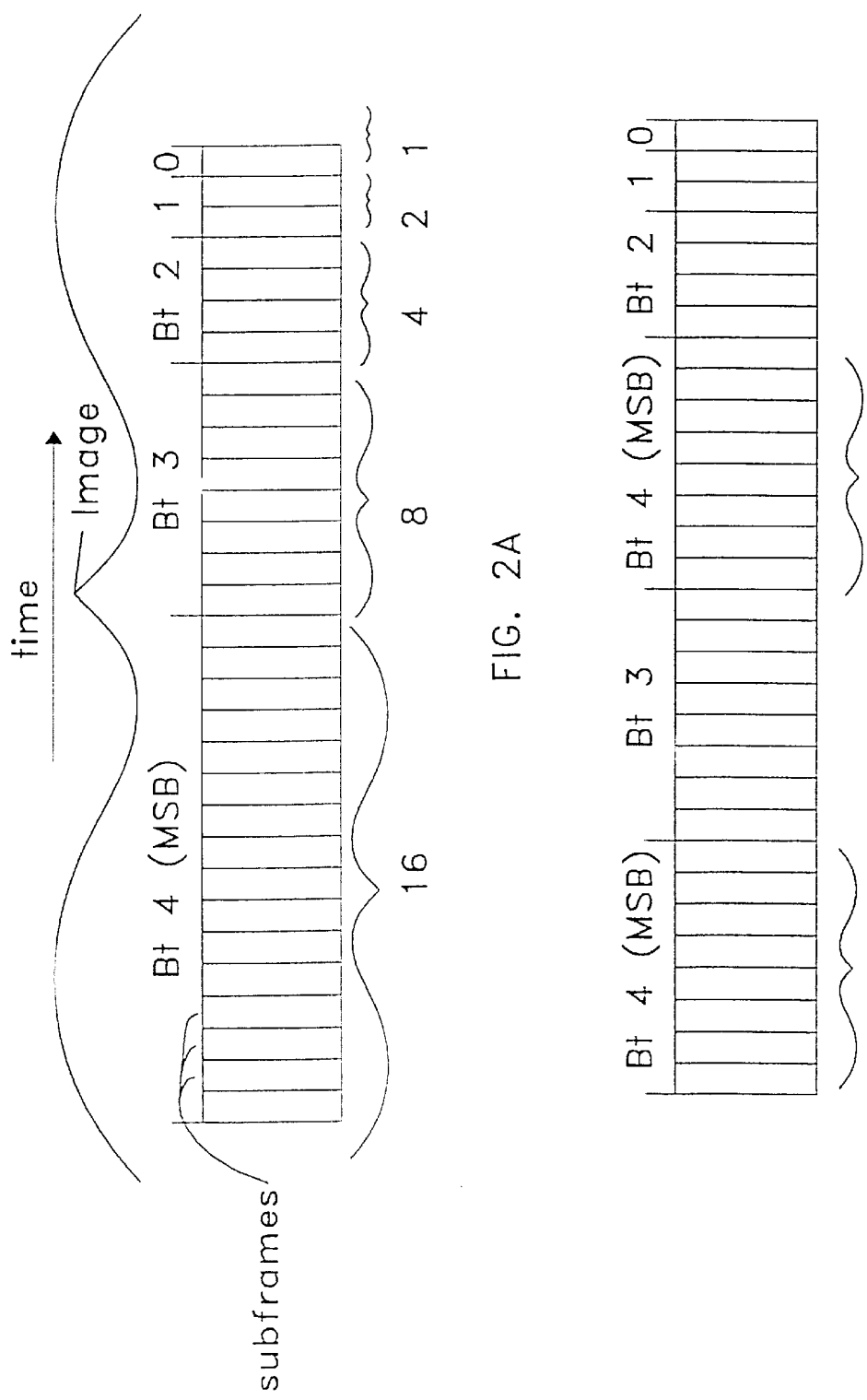
FIG. 2A demonstrates how subframes (such as bit plane binary subframes) can be displayed in different order within a group of subframes, some being advantageous over others in various situations.
FIG. 2B shows how the most significant bit frames can be distributed or spread through the entire group of frames.

Namely, since all of the subframes in each group are integrated together, one can display each of the 5 bit planes, i.e., bit 0 (the least significant bit or LSB), bit 1, bit 2, bit 3 and bit 4 (the most significant bit or MSB) as shown in FIG. 2A. In this scheme, the least significant bit (bit 0) frame is displayed for one frame or time period t, the next bit (bit frame) for two frames or time 2t, and the most significant bit (in this case for $2^{p-1}$t, where p=5) for 16 frames or 16t.

In practice, when the frame rates are approaching the lower limits for temporal integrating, it is advantageous to spread the MSB through the frame which corresponds to group 105 in order to remove contouring artifacts as is known in the art. FIG. 2B shows one way this might be done. Comparing FIG. 2A with 2B, it is seen that those pixels which are On for 16 subframes, i.e., for a total time 16t—thereby corresponding to the MSB or bit 4, they can be turned ON for half of that time or 8t, followed by pixels with bit 3 are ON for 8t, and then re-turn ON the MSB pixels again for the remaining time 8t so that they have been displayed for the necessary 16t time.

It is apparent from FIG. 2A and 2B that generation of a 24 bit time-sequential grey-scale (or color) images in this way requires a very high speed display, and/or a reduction in image rate (24-bit refers to 8 bit grey-scale for each of the three colors used, which would require 255 subframes for each color.) Namely, display system 115 has to run fast enough to display the least significant frame, i.e., the frame displaying the LSB.

FIGS. 3A corresponds to FIG. 2A and FIGS. 3B, and 3C show a method of rearranging the frames such that display system 115 is not required to run at a rate 1/t in order to display the LSB. Note that FIG. 3A shows all pixels displaying the same intensity Io and it is only the amount of time a particular pixel is displayed that results in the grey-scale effect. The MSB subframes are those identical subframes containing pixels which are ON to display the most significant bit. The LSB subframe is the subframe containing pixels which are ON to display the least significant bit.

FIG. 3B shows how the group 105 is combined to effect a 5 bit grey-scale (for each of Red, Green and Blue) without requiring that display device 115 be capable of rates of 1/t. As can be seen, the rate requirement for display device 115 is reduced from 1/t to 1/(2t). In order to compensate for the additional time t that the LSB frames are ON, the intensity of pixels in that frame is decreased by half from Io to Io/2. The letter m' is used to indicate the number of bits which are grouped together to yield the LSB time. Hence, referring to FIG. 3A, m'=0 and hence no additional bit is grouped together with the LSB and thus no decrease in the required rate of performance of display device 115 is achieved. When m'=1, however, the first bit subframes and the 0th bit subframe are grouped together as shown in FIG. 3B and hence the rate requirement of display 115 is reduced by half to approximately 1/(2t). This reduction is accompanied, however, by a new requirement that display device 115 be capable of outputting three different intensity levels, namely Io, Io/2 and 0, rather than the two intensities Io and 0 for the m'=0 case. for a binary display device this may be accomplished by modulating the illumination light at the appropriate time, or modulating the optical output from the display device at the appropriate time.

FIG. 3C takes the process one step further. Here, the LSB frames, the 1st bit frames (frames displaying bits in the next to least bit position) and the 2nd bit frames are grouped together. In this case, the rate requirement for display device 115 is reduced by approximately 75% from 1/t to approximately 1/(4t). In this case, since the next to least significant bit (bit 1) is ON just as long as the bit 2 frames are ON, their intensity is reduced by half to Io/2. Similarly, since the LSB bit frame is ON just as long as the LSB frame, the intensity of the LSB frame is reduced by half, from Io/2 as in FIG. 3B to Io/4. Hence, in this case the rate that display 115 must be capable of functioning, is reduced by approximately 75% from 1/t to approximately 1/(4t). For the example shown in FIGS. 2A and 2B, this means that the 10 kHz frame rate is reduced to 2.5 KHz.

Figure 3D:
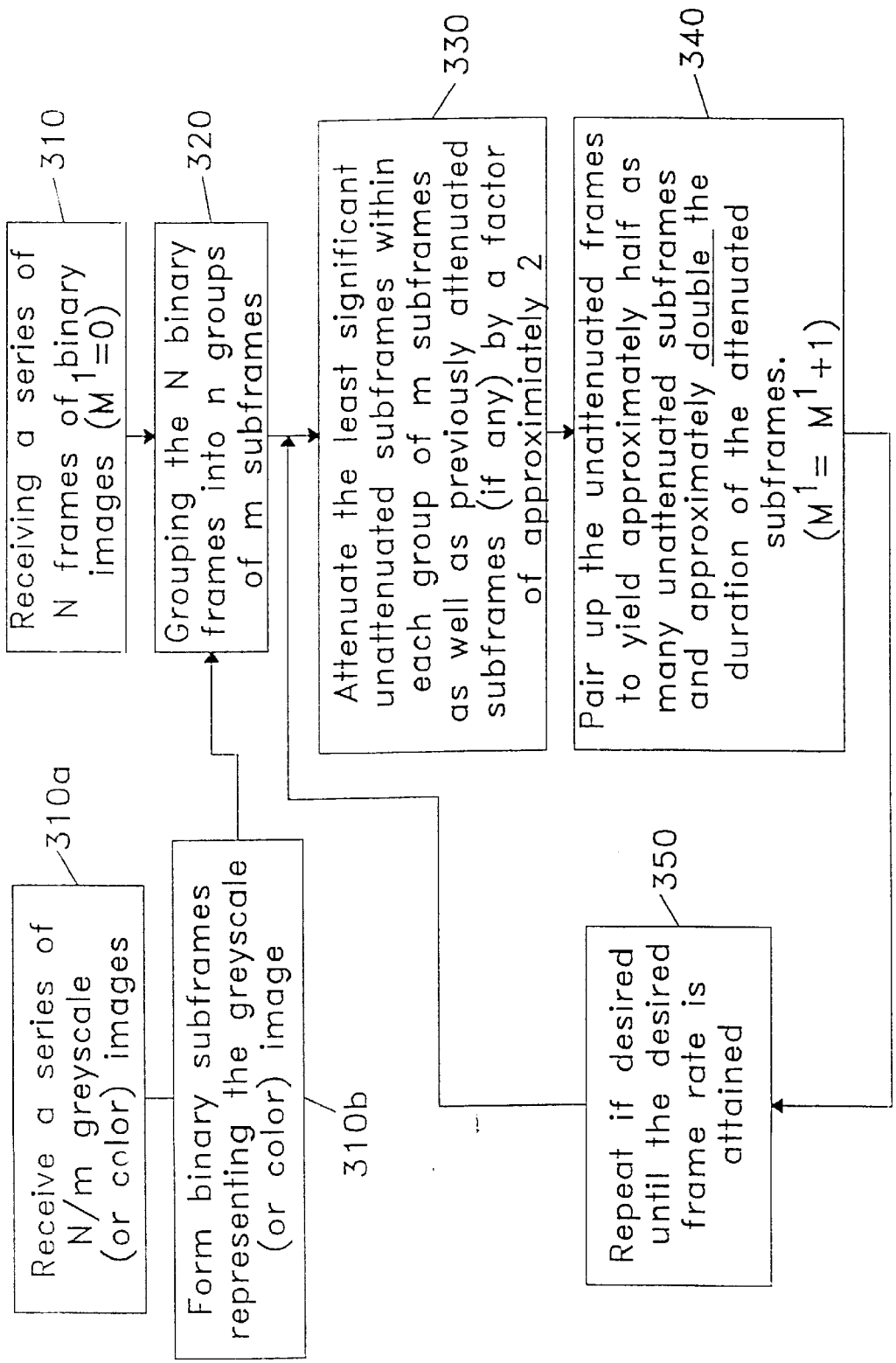
FIG. 3D shows the steps required to achieve the process shown in FIGS. 3A–3C according to one embodiment of the invention.

The approach discussed with respect to FIGS. 3A–3C can be generalized as follows. FIG. 3D shows steps required to generalize the process shown with respect to FIGS. 3A–3C. In particular, FIG. 3D shows step 310 for receiving a series of N frames of binary images (each initially to be displayed at a rate of 1/t), where N is an integer. Alternatively, if grey-scale or color images are received instead of binary images, then step 310 is replaced by steps 310a and 310b. Namely, step 310a involves receiving a series of grey-scale (or color) images and step 310b involves forming binary subframes representing these grey-scale (or color) images.

After either step 310 or steps 310a and 310b are performed, step 320 is performed. Step 310 involves arranging the series of N frames of binary images into n groups of m binary subframes, where m is less than or equal to N. Step 330 involves attenuating the least significant unattenuated subframes within each group of m subframes as well as previously attenuated subframes (if any) by a factor of approximately 2. Step 340 involves pairing up the unattenuated frames to yield approximately half as many unattenuated subframes and approximately doubling thereby, the duration of the attenuated subframes. Please note, however, that by approximately ½ it is meant that the attenuation could be anywhere from a few percent to 20 percent or more of half. The exact amount of attenuation (or variation in intensity) could be determined by simply implementing the attenuation process for various amounts of attenuation and asking observers or viewers which amount of attenuation is most effective. Note that m' is increased by 1 once step 340 has been completed. Step 350 allows one to repeat the last two steps of 330 and 340 until the desired frame rate is achieved.

The above process can be continued and m' increased. For case of 8 bits, (i.e., m from FIGS. 1A–1C is 255), m' from FIGS. 3A–3C can range from 0 to 7. The number of subframes for m=255 is: 255 for m'=0, 128 for m'=1, 65 for m'=2, 33 for m'=3, 19 for m'=4, 12 for m'=5, 9 for m'=6, 8 for m'=7. The parameter m' is the number of bits which have their illumination attenuated.

The above approach does result in an effective loss of optical throughput. That is, there is a data-rate/throughput trade-off which is shown in Table 1. Note that referring to the left part of Table 1 (m'=1,2), the optical throughput is slightly reduced for a significant reduction in the frame rate required for a given image-rate.

Also note that the relative data rate is shown for two different situations. The first calculation corresponds to the timing which is drawn in FIGS. 3A–3C for clarity. In this case, the time taken to display a complete grey-scale image is increased slightly with m'. This can be seen if one compares FIG. 3A with FIGS. 3B or 3C in which one can clearly see that the overall data rate is decreased. That is, the attenuated subframes extend further to the right in FIGS. 3B and 3C than FIG. 3A. Consequently, in practice, a second calculation can be made to adjust the data rate by shortening the frame durations from 2t (FIG. 3B) or 4t (FIG. 3C) to slightly less than that amount to achieve the data rate to perceive the same image rate. The approximate amount of adjustment can be calculated as follows. If $B_{m'}$ is the number of subframes for a given m', and if m is the number of subframes when m'=0, then as subframes are paired in order to go from FIGS. 3A to 3B to 3C, they should be shortened by a fraction of about $(mt)/[(B_{m'} 2^{m'})t]=m/[(B_{m'} 2^{m'})]$, where mt is the duration of the subframes 105 with m'=0 and $(B_{m'} 2^{m'})t$ is the duration of the subframes 105 when for m' not equal to 0.

TABLE 1

(grey-scale level = 256)

| subframes | 255 | 128 | 65 | 34 | 19 | 12 | 9 | 8 |
|---|---|---|---|---|---|---|---|---|
| m' | 0 | 1 | 2 | 3 | 4 | 5 | 6 | 7 |
| Rel. throughput | 100% | 99.6% | 98% | 94% | 84% | 66% | 44% | 25% |
| Rel. data rate (FIG. 3) | 1 | 0.5 | 0.25 | 0.12 | 0.06 | 0.03 | 0.015 | 0.008 |
| Rel. data rate (constant image rate) | 1 | 0.5 | 0.255 | 0.13 | 0.07 | 0.05 | 0.035 | 0.03 |

The above table is calculated using the steps in FIG. 3D which can be summarized as follows. Starting with the unattenuated subframes, remove the least significant one and attenuate it to half its value and increase its duration by a factor of two (along with other already attenuated frames). Then the remaining unattenuated frames can be combined into half as many unattenuated frames. For example, to go from m'=2 to m'=3 the process is as follows. At m'=2, there are 63 unattenuated subframes and 2 attenuated ones. Taking the least significant unattenuated frame, attenuate it by a factor of two (also attenuate the two attenuated frames by another factor of two). We now have 3 attenuated subframes and 62 unattenuated subframes which are converted to 31 unattenuated frames of double the duration. This yields 34 subframes.

The effective attenuation of the illumination can be achieved in several ways. One approach is to modulate the intensity of the illumination applied to the entire display device 115 at the appropriate time. Another approach is to modulate the transmission of an element between the display and the viewer. Another approach is to pulse modulate the illumination source which illuminates the display device at the appropriate time to illuminate the attenuated subframes for a shorter duration. Another approach is to use a display device that has that capability of simultaneously allowing subframe data to be loaded at the rates described above but then to be displayed for a shorter time similar to the case of pulse modulated illumination described above. The illumination sources in some such devices are easier to adjust than others.

FIGS. 4A, 4B and 4C show these two approaches for the above discussed case of illumination modulation corresponding to FIG. 3C (m'=2) with a frame rate of 1/(4t). In particular, FIG. 4B shows intensity modulation as discussed above. FIG. 4C, however, shows an intensity output to achieve the same or nearly the same result. Again, the intensity profiles are for the source illuminating display device 115. Here, the intensity of all of the bits remains the same and it is their duration which is varied. For example, the duration that the pixel source is ON for the LSB is time t0, which is less than the time 4t shown in FIGS. 4A and 4B. The next to last bit or bit 1 is ON for a time t1 greater that t0 but less than 4t (otherwise it would appear as bright as a pixel with bit 2 ON). In particular, the lengths t0 and t1 are adjusted in a manner similar to the adjustment of intensity in that t1 is approximately half of the total time 4t, i.e., t1 is about 2t. Similarly, t2 is approximately half of t1 and hence approximately one fourth of 4t or simply t.

Figure 4D:
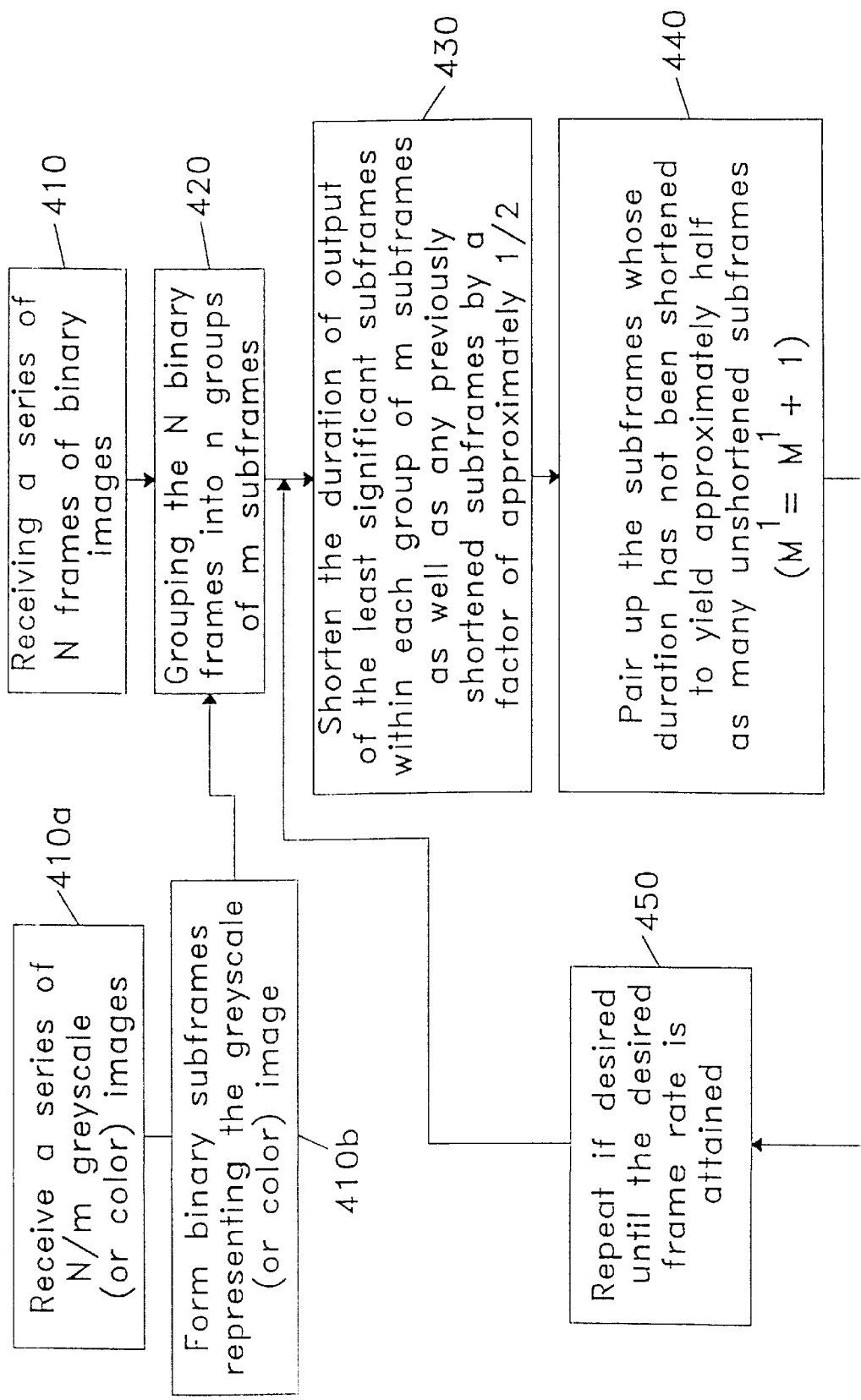
FIG. 4D shows a method for displaying a grey-scale image on a display unit with a plurality of pixels according to another embodiment of the invention.

FIG. 4D shows a method for displaying a grey-scale image on a display unit with a plurality of pixels according to another embodiment of the invention. Step 410 involves receiving a series of N frames of binary images each to be displayed at a rate of 1/t, where N is an integer. Alternatively, if grey-scale or color images are received instead of binary images, then step 410 is replaced by steps 410a and 410b. Namely, step 410a involves receiving a series of grey-scale (or color) images and step 410b involves forming binary subframes representing these grey-scale (or color) images. Step 420 then involves arranging the series of N frames of binary images into n groups of m binary subframes, where m is less than or equal to N. Step 430 involves shortening the duration of output of the least significant subframes within each group of m subframes as well as any previously shortened subframes by a factor of approximately ½. Please note, however, that "approximately" ½, means that the shortening could be about 50% + or − 20% or possibly more—this can be determined by simply implementing the shortening process for various amounts of shortening and observing which amount of shortening is most effective. Note that m' is in fact increased by 1 once step 440 has been completed. Step 450 allows one to repeat the last two steps of 430 and 440 until the desired frame rate is achieved.

Display device 115 can include any time-sequential (grey-scale) display whether liquid-crystal on silicon, digital mirror devices, etc. . . . Even if the light modulation mechanism is intrinsically capable of very high frame rates, the data rates from the display driving electronics as well as the display itself should be reduced for reasons of cost and cabling convenience.

All of the above discussion can be applied to color displays which briefly discussed earlier. Here, the color light source may be, for example, 3 separate light sources, namely, a red light source, a green light source and a blue light source. These color light sources can be, for example, a red light emitting diode, a green diode, and a blue diode, respectively or a white light source which is sequentially filtered to appear red, green or blue, or a filter between the display and the viewer which is sequentially switched to transmit red, green or blue. Each of these light sources is treated in a manner analogous to the above light source for grey-scale. In each of these situations, the output intensity is not attenuated in intensity or shortened in duration. Color "grey-scale" can be achieved, however, by applying either the steps of FIG. 3D for attenuation or the steps of FIG. 4D for duration shortening. This can be achieved for each of the light sources. That is, each of the red, green and blue light sources can be integrated by an observer as discussed above. For example, if the red light source outputs frames as in FIG. 3A with m'=0, then the rate of output can be reduced to approximately ½ that rate by attenuating the intensity of the red light source at the pixels in the least significant frame to approximately ½ (i.e., from Io to approximately Io/2), and then combining the unattenuated frames in pairs of duration 2t and doubling the duration of the least significant frame from t to 2t in the same manner as discussed in FIGS. 3A–3D and in particular in steps 330 and 340. This process

```
RR RR RR RR RR RR RR RR RR RR RR RR RR RR RR R

GG GG GG GG GG GG GG GG GG GG GG GG GG GG GG G

BB BB BB BB BB BB BB BB BB BB BB BB BB BB BB B
``` can be repeated (see step 350 in FIG. 3D). This procedure can be done for each of the red light source, green light source and blue light source.

Another example involves applying the method of FIGS. 4A–4D to each of the red, green, and blue light sources. For example, if it is desired that the red light source output frames as in FIG. 4A (which corresponds to m'=2), then instead of outputting the least significant frames with pixel outputs of the red light source at Io/4, the duration of the illumination or attenuation of those pixels is reduced by 4 from 4t to t. Similarly, instead of outputting the next to least significant frames with pixel outputs of the red light source at Io/2, the duration of those pixels is reduced by approximately 2 from 4t to 2t as shown in FIG. 4C. This process can be repeated as in steps 450 in FIG. 3D. This procedure can be done for each of the red light source, green light source and blue light source. Note that it may be advantages to intersperse red, green, and blue subframes to aid the integration process.

In practice, color displays are typically achieved using a RGB source where R corresponds to a subframe of pixels which are displaying red, G corresponds to a subframe of pixels which are displaying green, and B corresponds to a subframe of pixels displaying blue. Then the light source is used to output the following subframes. Referring to FIG. 3A, suppose the corresponding series of red subframes, green subframes and blue subframes are arranged as follows:

RRRRRRRRRRRRRRRRRRRRRRRRRRRRRRRGG GGGGGGGGGGGGGGGGGGGGGGGGGGGGGBBB BBBBBBBBBBBBBBBBBBBBBBBBBBBBB . . . , where each capital letter corresponds to a frame in FIG. 3A and this example m=31 (recall that m is the total number of subframes).

If each of the red, green and blue sources undergoes the process of FIG. 3B via implementation of steps 310–340 one time (so that m'=1), then the least significant frame (to be attenuated) can be represented by small letters r, g, and b for red, green, and blue, respectively. Using the above nomenclature, the output during illumination, the red, green and blue sources would be:

```
RR RR RR RR RR RR RR RR RR RR RR RR RR RR RR rr

GG GG GG GG GG GG GG GG GG GG GG GG GG GG GG gg

BB BB BB BB BB BB BB BB BB BB BB BB BB BB BB bb
``` where a space is depicted here only to make clear that two of the unattenuated frames are combined, it being understood that the spaces are analogous to the vertical lines separating frames in FIG. 3B. Typically, the RGB source outputs frames in the sequence RGBRGBRGB . . . Hence, the above could be output as RR GG BB RR GG BB . . . rr gg bb. As previously discussed, however, the order of the frames may be changed to aid the process of integration. Finally, the above series of frames could also have a shortened duration (as discussed in FIGS. 4A–4CD) of the least significant frame as can be shown as follows:

where a single letter R, G, or B, means that the duration of time that the pixel is ON is approximately half as long as the other pixels but the intensity of those pixels is not attenuated. Here again, the order of the frames can be altered and still appear the same to an observer.

For m'=2, the above can is combined as follows:

```
RRRR RRRR RRRR RRRR RRRR RRRR RRRR rrrr ssss

GGGG GGGG GGGG GGGG GGGG GGGG GGGG gggg hhhh

BBBB BBBB BBBB BBBB BBBB BBBB BBBB bbbb cccc
``` where a space is analogous to the vertical lines in FIG. 3C, and s, h and c are each half the intensity of r, g and b, and one fourth of the intensities of R, G, and B, respectively.

Again, it may be useful to chage order within the group of m frames, the above could be output in a variety of ways including RRRR gggg BBBB rrrr GGGG bbbb RRRR GGGG BBBB BBBB . . . RRRR hhhh BBBB ssss GGGG cccc. Again, the above series of frames could also have a shortened duration of time as discussed above with respect to FIGS. 4A–4D as follows:

```
RRRR RRRR RRRR RRRR RRRR RRRR RRRR RR R

GGGG GGGG GGGG GGGG GGGG GGGG GGGG GG G

BBBB BBBB BBBB BBBB BBBB BBBB BBBB BB B
``` where double letters RR, GG, and BB mean that the duration of the frames is approximately half as long as for the frames RRRR, GGGG and BBBB, respectively (but the intensity is the same). Similarly, the single letters R, G, and B, have durations of time that is half as long as the frames RR, GG, and BB, and one fourth as long as frames RRRR, GGGG, and BBBB. Here again, the order of the frames can be altered and still appear the same to an observer. Again, it should be understood that all of the attenuations and shortenings are approximate as discussed above.

Figure 5A:
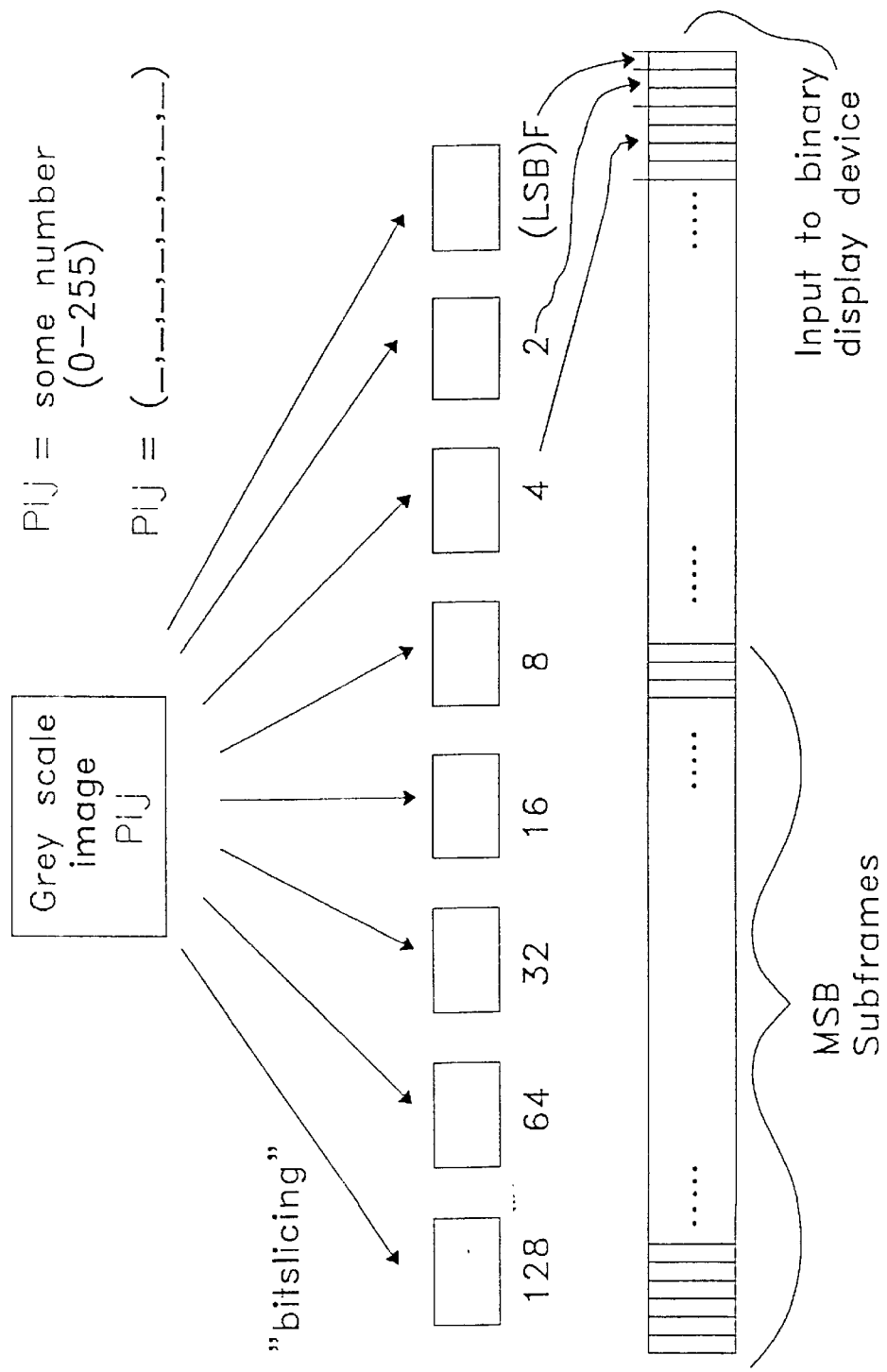
FIG. 5A shows how 8 bit grey-scale images (or 3×8 bit color images) can be displayed using a binary display device such as the device of FIG. 1B.

FIG. 5A shows how 8 bit grey-scale images (or 3×8 bit color images) can be displayed using a binary display device such as device 115 of FIG. 1B. Although 8 bit subframes are shown, it should be understood that any number grey-scale can be used if the application demands greater or lesser precision. One way this can be done is to generate the sequence of subframes from bit-frames derived from analog signals. To do this the analog signal (or signals if R, G, and B have been separated), which represents the brightness of the image on a series of scan lines could be sampled with an analog-to-digital converter (ADC). The outputs from the ADC then become the binary values for the bit-frames corresponding to the value of the respective ADC outputs. As the analog signal is repeatedly sampled, the pixels in the bit-frames are assigned values in a sequence which matches the raster scanning pattern used in the analog signal representation.

Figure 5B:
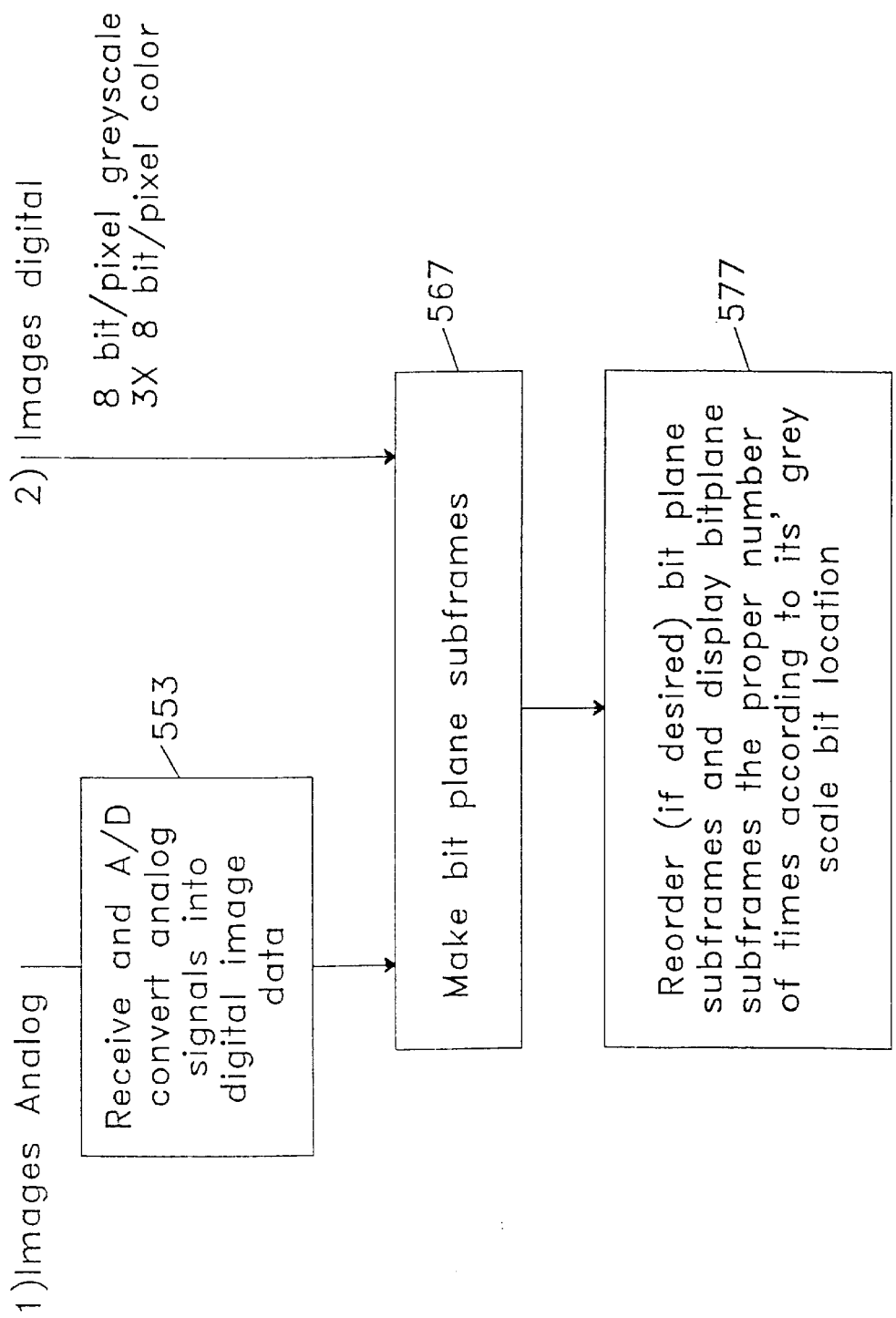
FIG 5B demonstrates how analog image signals as well as digital data (such as the images of FIG. 5A) can lead to binary subframes which in turn can be displayed via the methods of FIGS. 3A–3D and 4A–4D.
Figure 8:
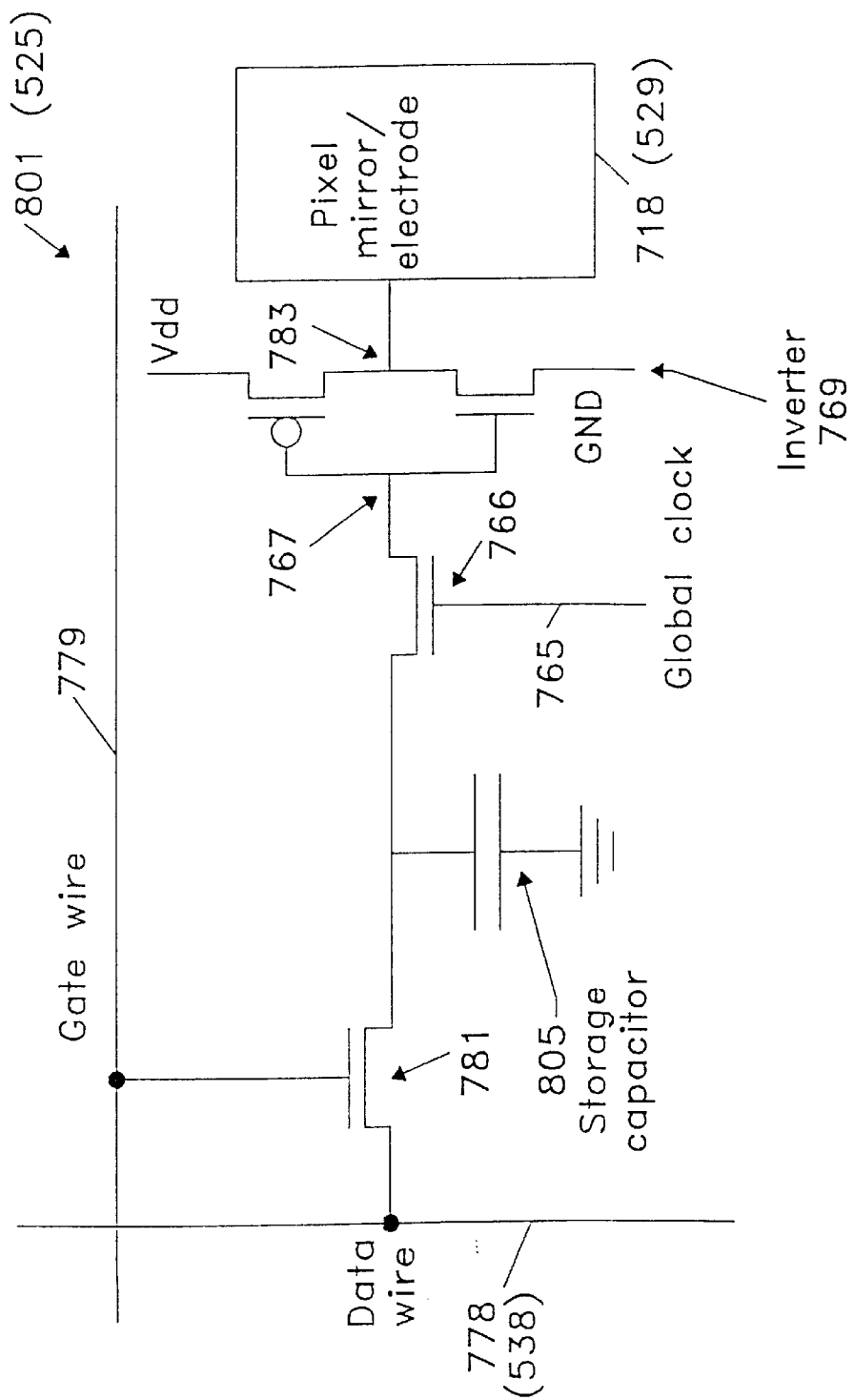
Figure 9A:
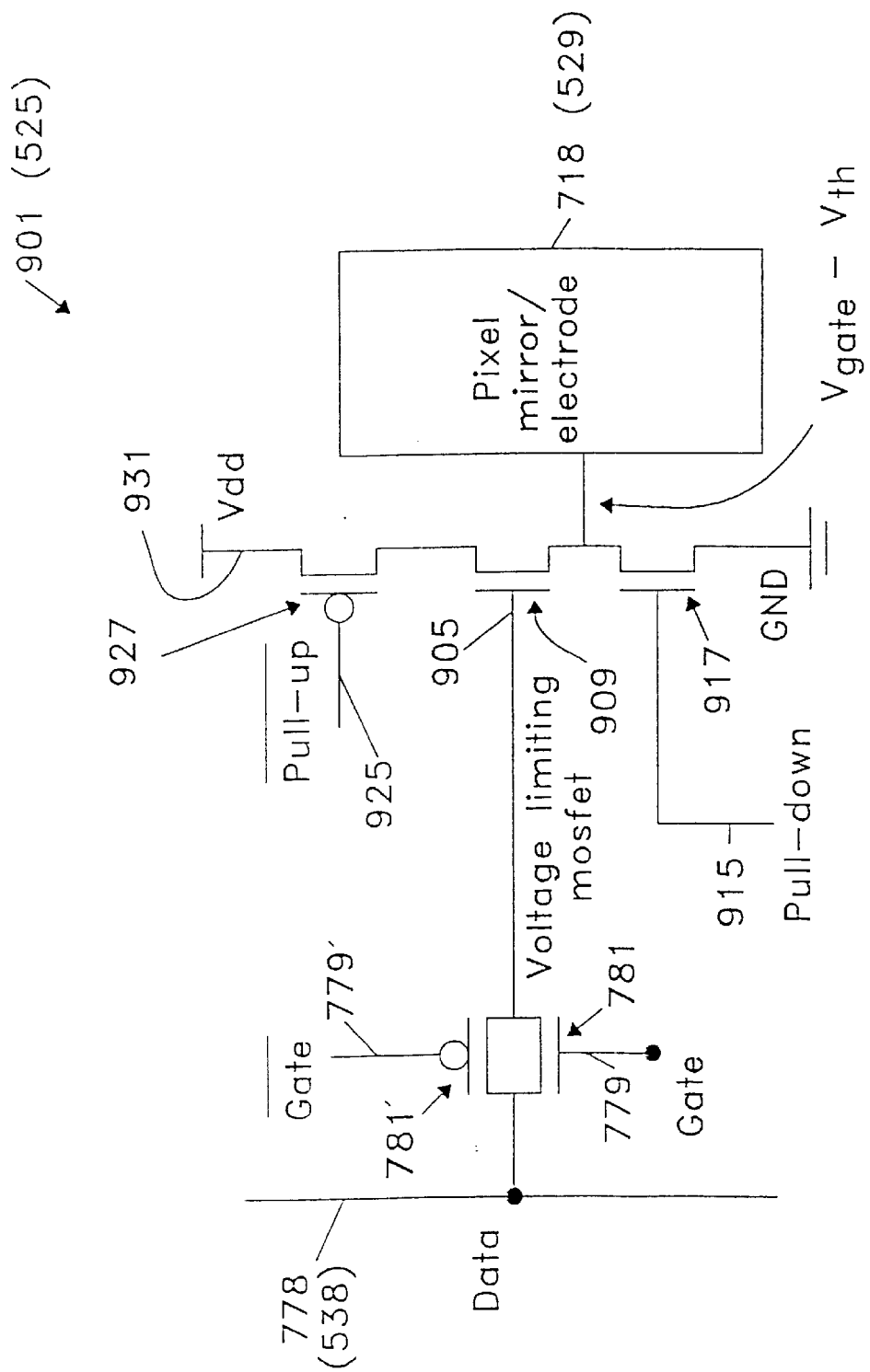
Figure 9B:
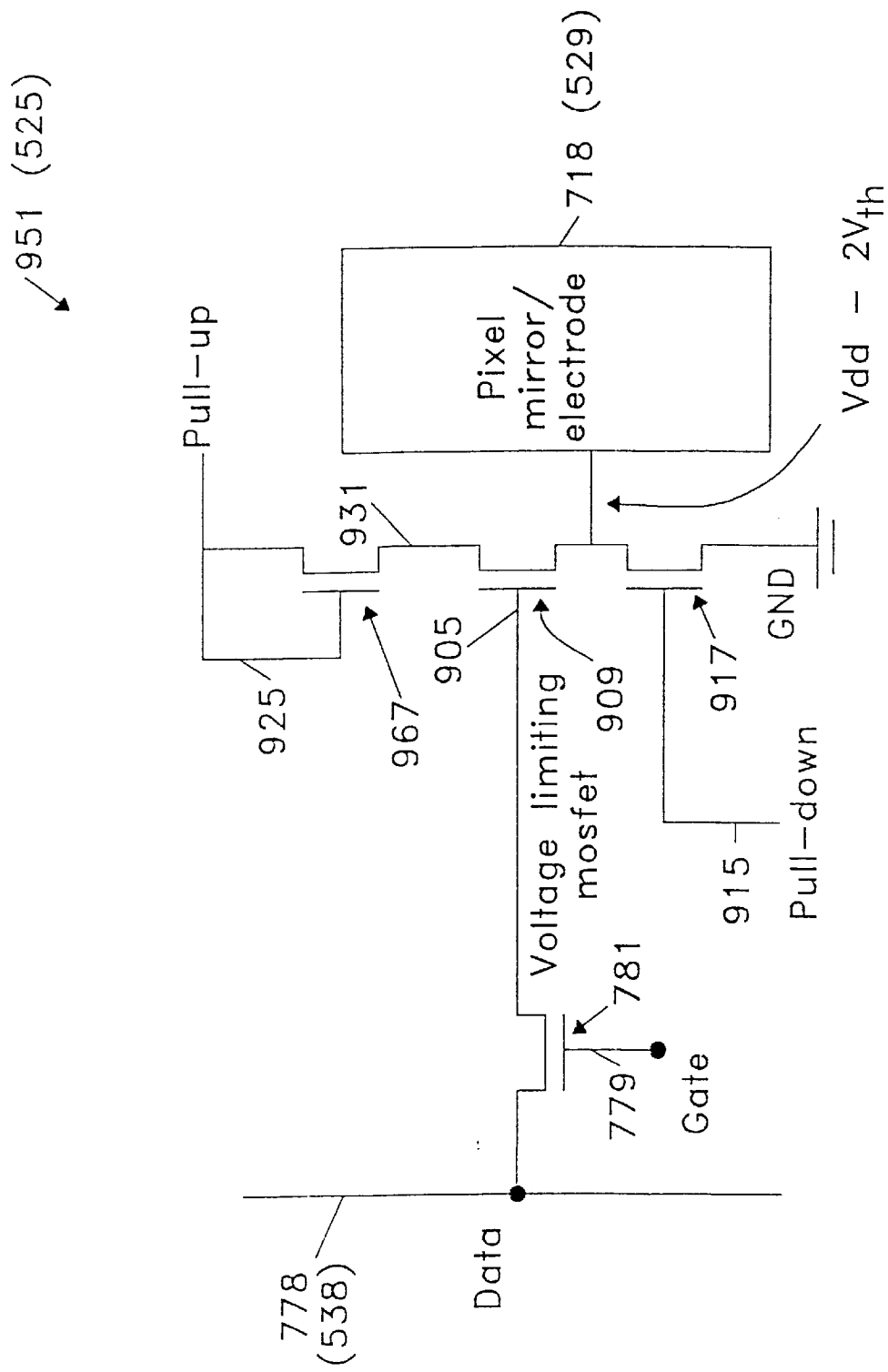
Figure 10:
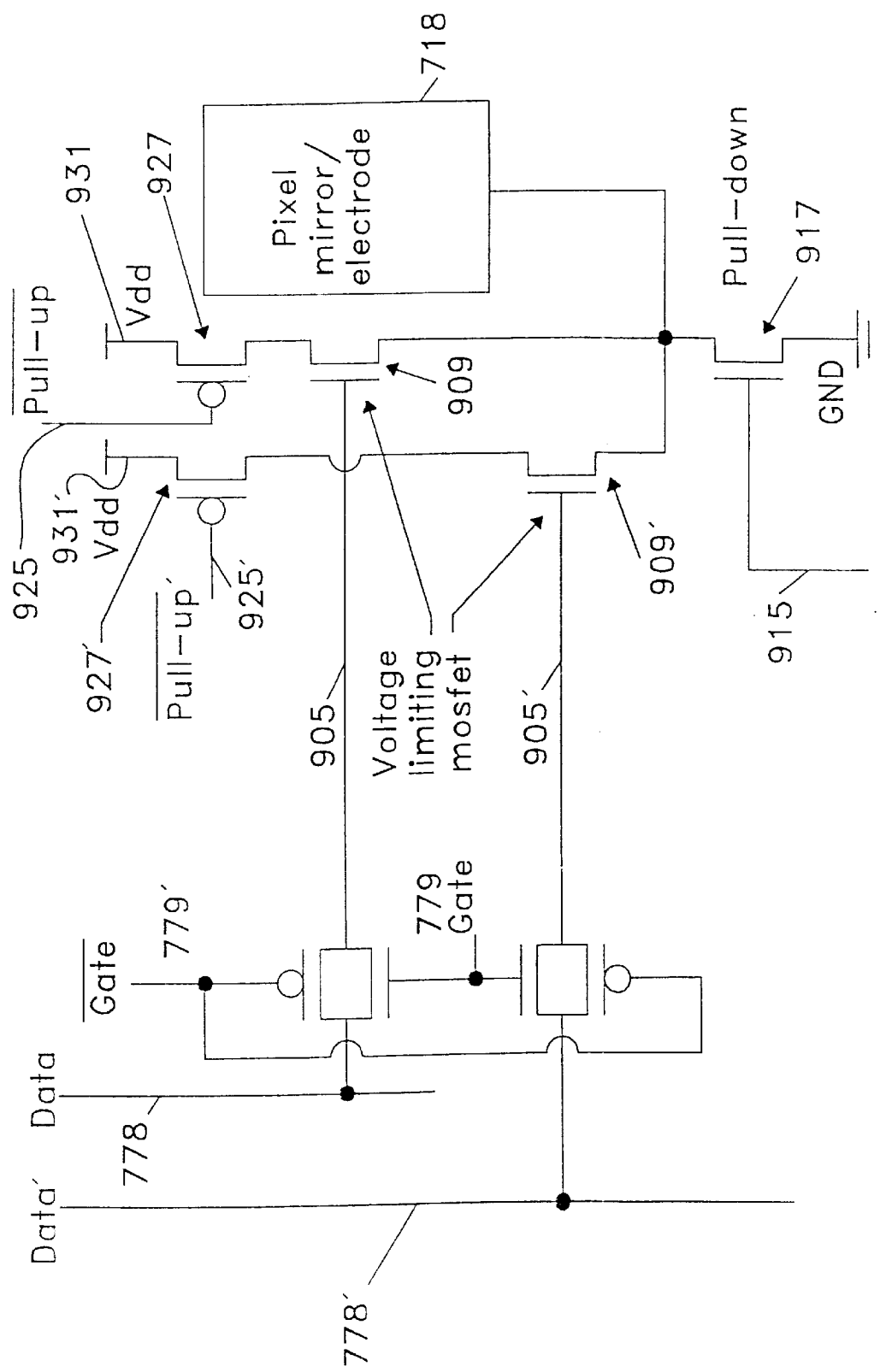
Figure 11:
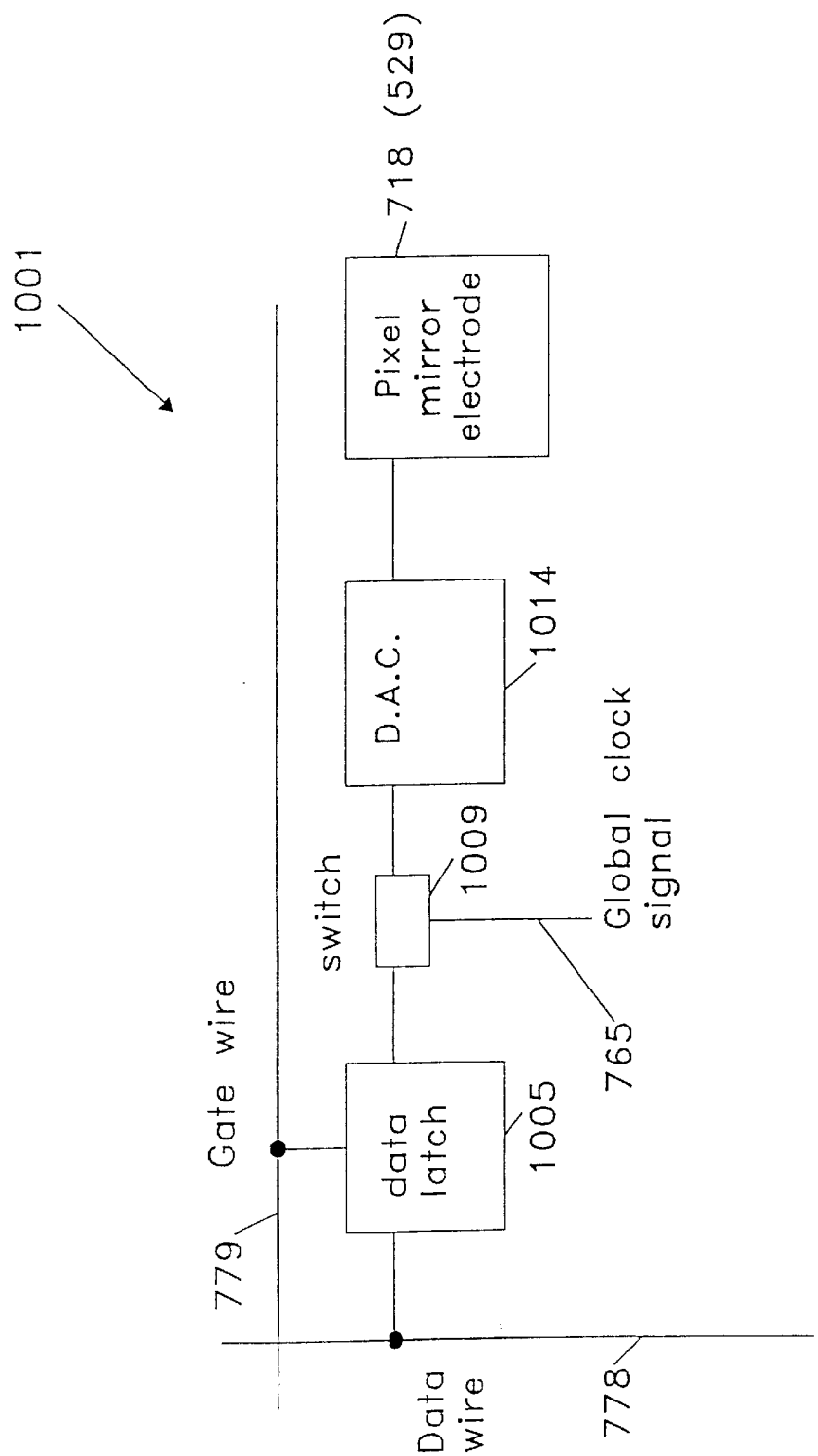

FIG. 5B demonstrates how analog image signals as well as digital data (such as the images of FIG. 5A) can lead to binary subframes which in turn can be displayed via the methods of FIGS. 3A–3D and 4A–4D. In the example shown in FIG. 5B, 8 bit grey-scale or 3×8 bits pixel color are discussed, it being understood that any number of bits could be used. FIG. 5B involves either: 1) receiving images in analog form at step 553 and converting these images into digital image data; or 2) receiving the digital images directly. Once received, these digital images are rearranged into bit plane subframes at step 567. Again, as discussed above with respect to FIG. 5A, if the digital images are grey-scale images or color grey-scale images, then step 567 involves bit slicing as shown in FIG. 5A. Alternatively, if the digital images are binary subframes, then step 567 involves bit slicing as shown in FIG. 1E. Finally, step 577 involves reordering (if desired) the resulting bit plane subframes and displaying those bit plane subframes the proper number of times in accordance with that bit plane's grey-scale bit location. That is, as discussed above, if an 8 bit grey-scale is desired, then the MSB subframe is displayed $2^7=128$ times, the next to the MSB subframe is displayed $2^6=64$ times etc. . . . , to the LSB subframe which is displayed one time. Recall that there may be advantages in not displaying each bit frame (especially for the MSB) all together or in succession. That is, sometimes, in order to avoid flicker, the MSB and other images can be split up and intermittently displayed.

Figure 6A:
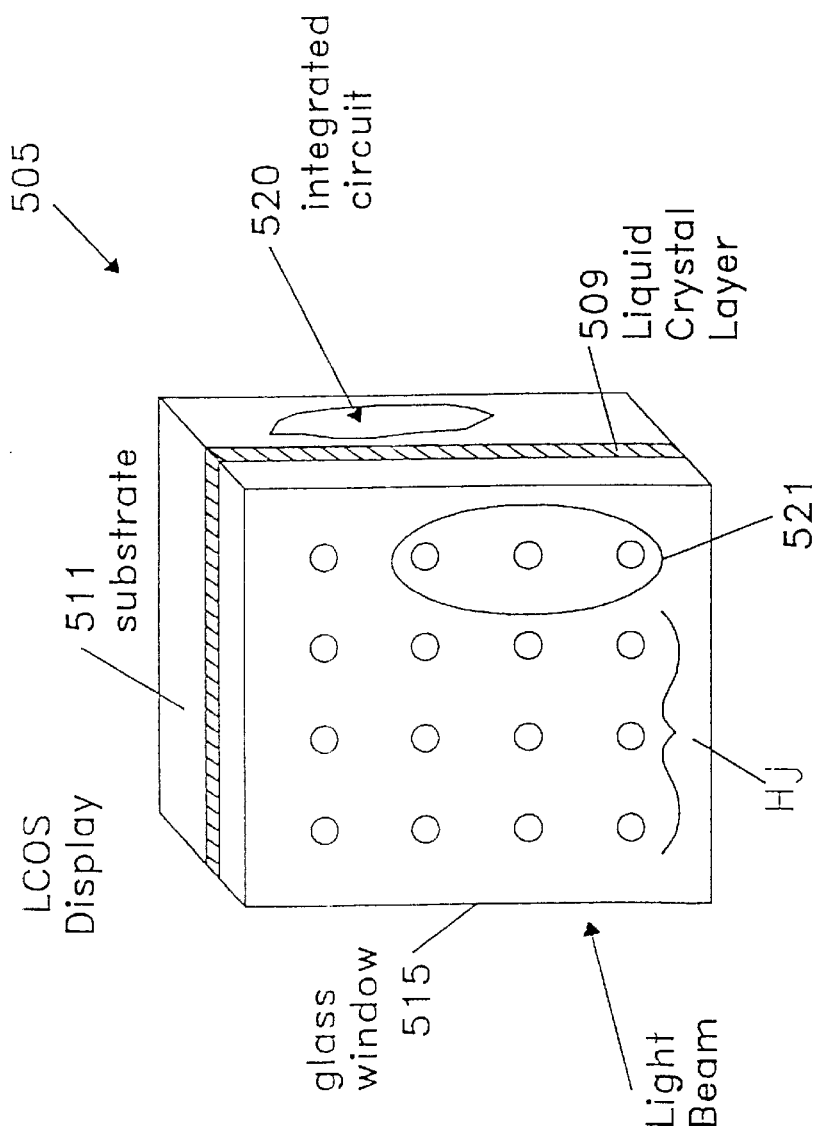
FIG. 6A shows a display which can serve as display 115.
Figure 6B:
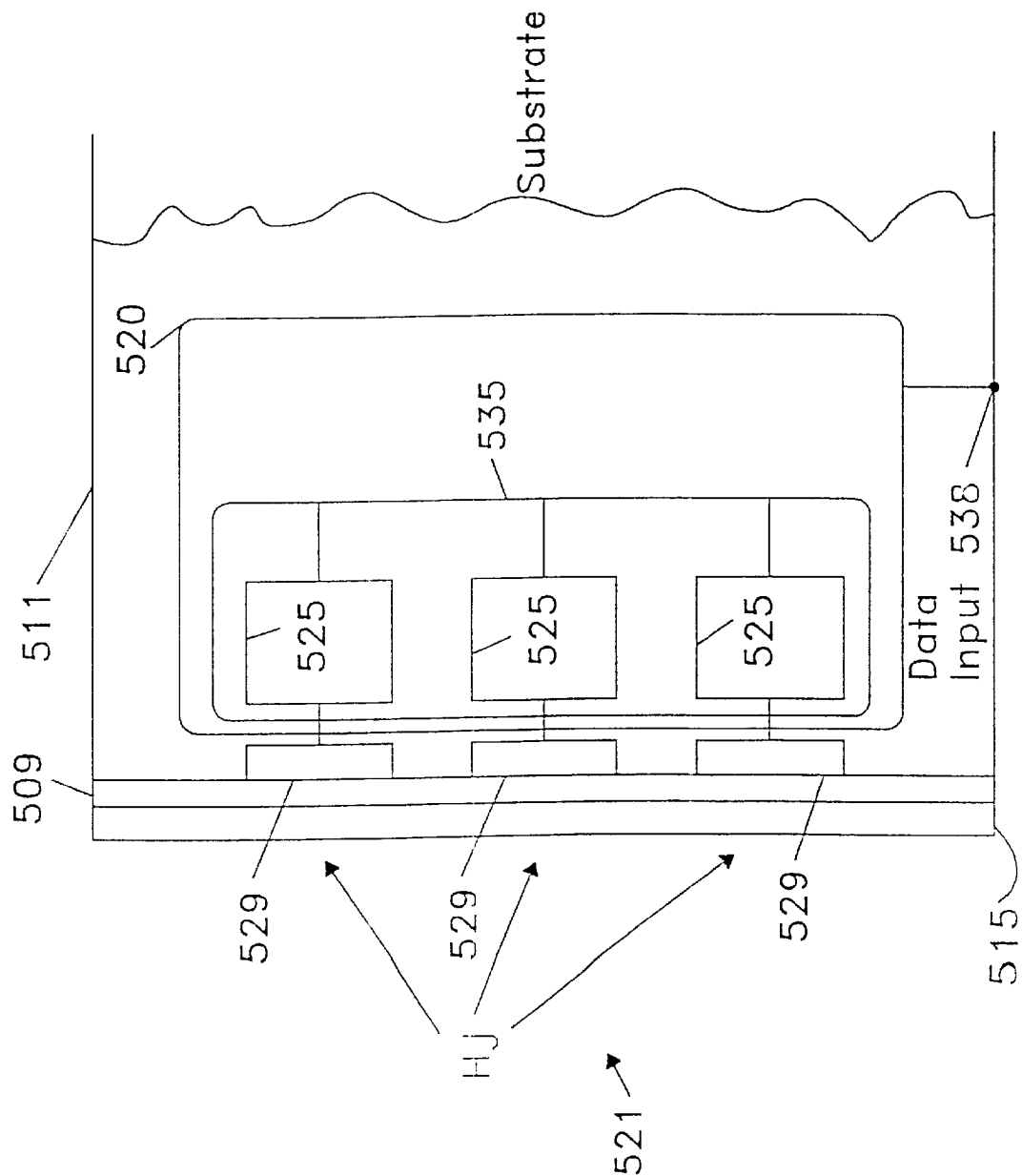
FIG. 6B shows a close-up view of any one of pixels Hj according to another embodiment of the invention.
Figure 7A:
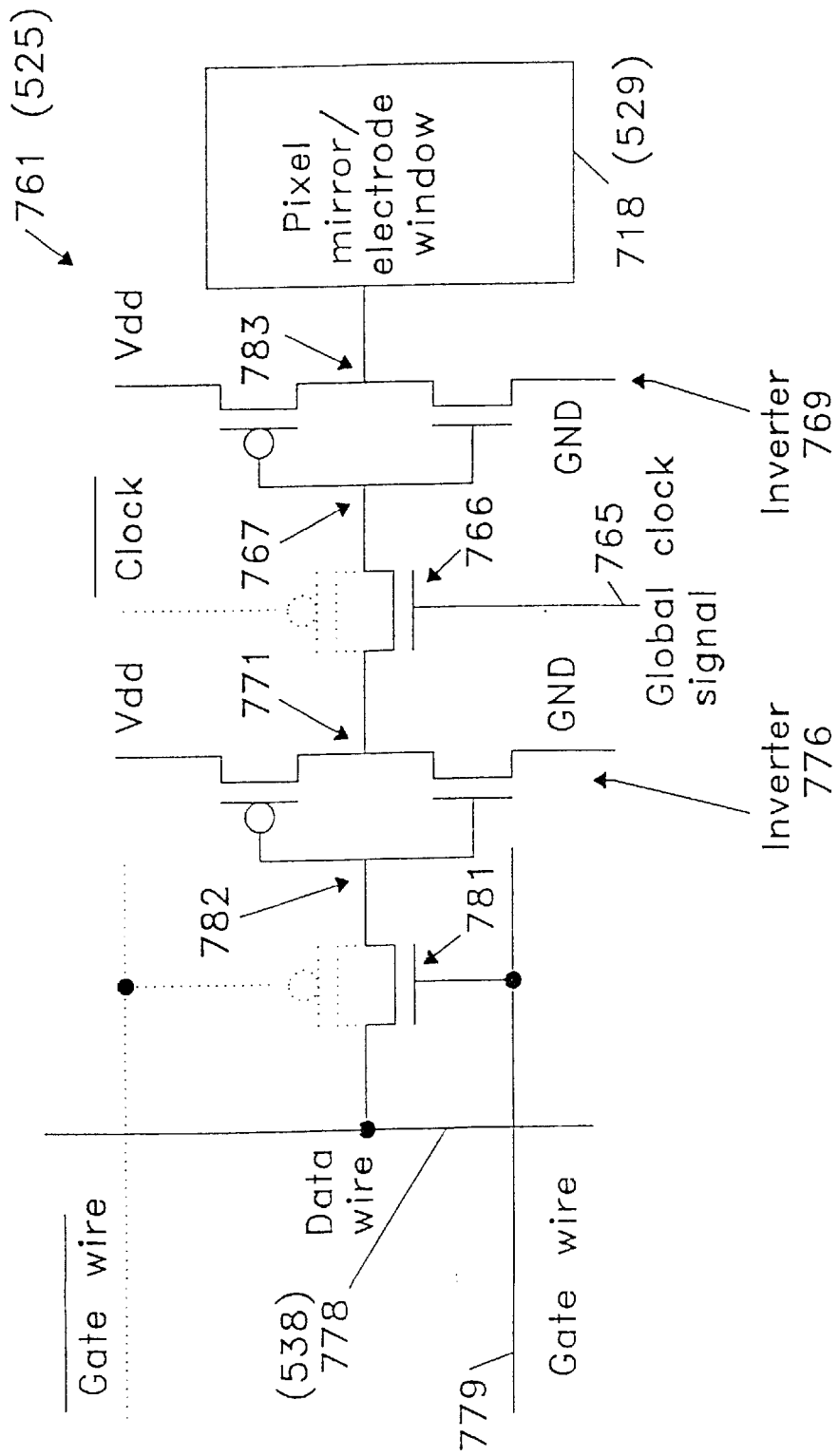
Figure 7B:
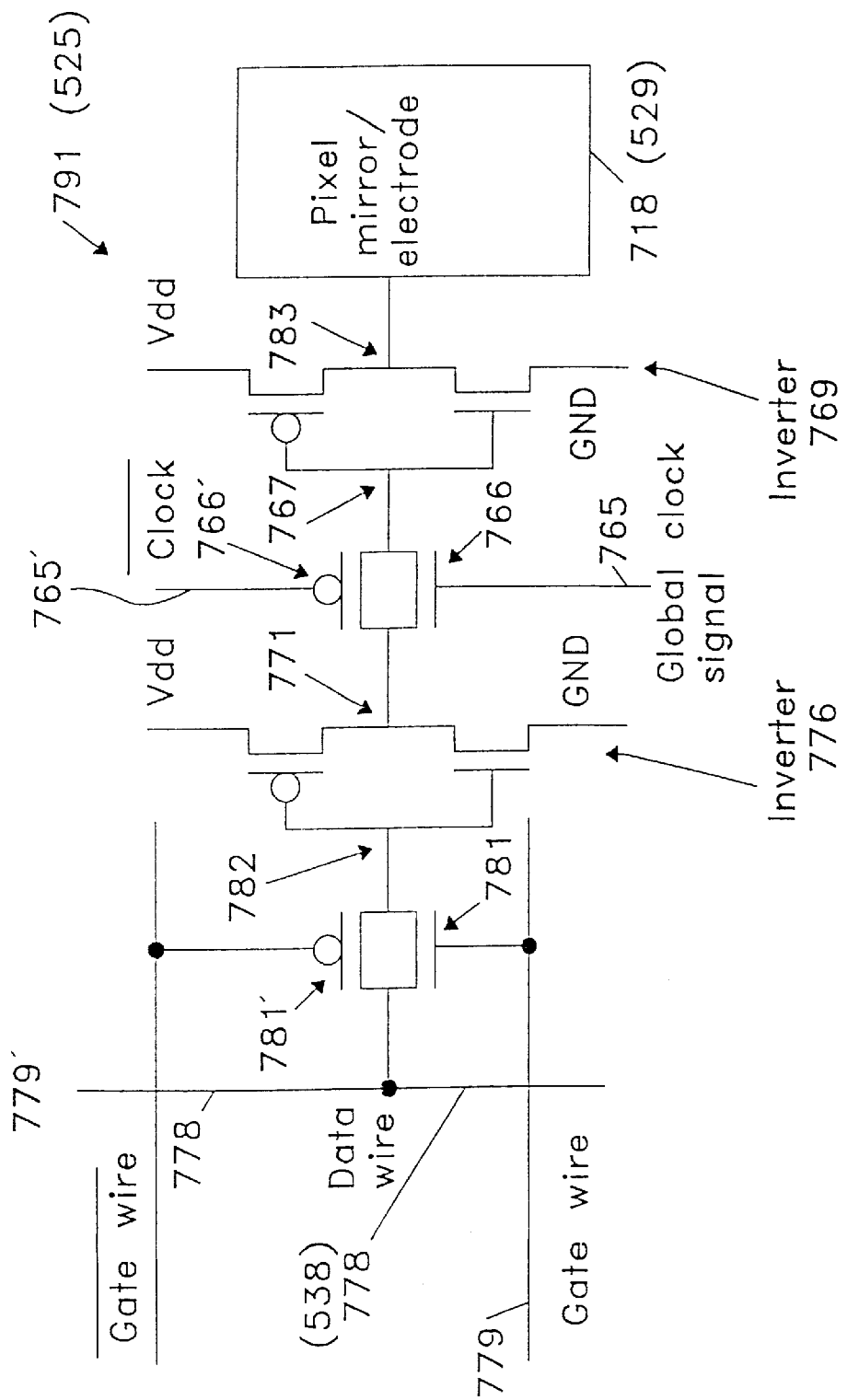

FIG. 6A shows a display 505 which can serve as display 115 and FIG. 6B shows a close-up view of any one of pixels Hj. Liquid crystal on silicon (LCOS) displays or spatial light modulators could serve as display 115. In particular, referring to FIG. 6A, an LCOS display 505 includes a thin layer of liquid crystal 509 on a silicon substrate 511 which is covered by a glass window 515. Substrate 511 includes an integrated circuit 520 with pixels Hj. Integrated circuit 520 is used to apply an electric field across the liquid crystal layer 509 in order to reorient the liquid crystal and thereby modulate a light beam that is reflected from substrate 511 as shown in FIG. 5 or in special processes, transmitted through substrate 511. It is advantageous if integrated circuit 520 uses an area which is comparable with, or less than that used by existing static pixel designs. Standard 1.2 micrometer CMOS design can be used as it has for existing static pixel designs to yield an approximately 20 micrometer by 20 micrometer pixel area.

FIG. 6B shows a close-up view of a group of three pixels Hj such as the three pixels 521 as well as some of the associated electronics according to one embodiment of the invention. Note that FIG. 6B is only a schematic representation of several pixels together with their associated electronics. In particular, a series of pixel buffers 525 are respectively coupled to liquid crystal driving electrodes 529 of pixels Hj to integrated electronics 520. The entire group of pixel buffers 525 comprise an image buffer 535. A data input 538 receives image data to be eventually displayed.

Display 505 operates as follows. New image data would be received via input 538 by integrated circuit 520 and stored in frame buffer 535 but not yet applied to liquid crystal layer 509. This allows the previous image to be viewed without it being gradually displaced by the new data. Once frame buffer 535 has been completely filled with the new data, that new data is simultaneously transferred from pixel storage elements 525 to liquid crystal driving electrodes 529.

Note that the above scenario makes it possible to significantly reduce the time interval during which the displayed data is changing. For example, consider a standard LCOS device is used which has 1024 by 1024 pixels, which addresses and begins to update the pixels a row-at-a-time. For such a standard system which includes 32 data wires running at 50 Mbits/second, the displayed data is updated in about 655 microseconds. However, display system 505 which replaces the old image data with the new image data, is limited to the switching time of the pixels and in particular, of the liquid crystal device, which is about 100 microseconds. Note that pixels Hj are not necessarily static and indeed at this point a dynamic type pixel approach might be preferable.

What is claimed is:

1. A method for displaying an image on a display with a plurality of pixels, comprising the steps of:
    receiving image data comprised of a series of attenuated and unattenuated subframes, wherein the unattenuated subframes are formed by combining precombined subframes;
    storing the image data in a plurality of storage elements; and
    displaying the image data in the plurality of pixels.

2. The method of claim 1, wherein a first frame rate of the unattenuated subframes is lower than a second frame rate of the pre-combined subframes.

3. The method of claim 1, wherein the unattenuated subframes are binary.

4. The method of claim 1, wherein the attenuated subframes are not binary.

5. The method of claim 1, comprising the further step of:
    modulating the attenuated subframes using intensity modulation.

6. The method of claim 1, comprising the further step of:
   modulating the attenuated subframes using pulse modulation.

7. The method of claim 1, comprising the further step of:
   grouping the unattenuated subframes in unattenuated subframe groups.

8. The method of claim 7, wherein the unattenuated subframe groups for an associated image vary in size with each unattenuated subframe group including $2^n$ unattenuated subframes, where n is an integer.

9. The method of claim 8, wherein each unattenuated subframe group is associated with a bit of a digital image value.

10. The method of claim 9, wherein the digital image value represents an A/D conversion of the associated image.

11. The method of claim 7, wherein said step of displaying includes sequentially displaying the unattenuated subframes of each unattenuated subframe group.

12. The method of claim 7, wherein said step of displaying includes not sequentially displaying the unattenuated subframes of each unattenuated subframe group.

13. The method of claim 1, wherein said step of displaying includes approximately simultaneously displaying, across the plurality of pixels, each of the attenuated and unattenuated subframes.

14. The method of claim 1, wherein said plurality of storage elements are static.

15. The method of claim 1, wherein said plurality of storage elements are dynamic.

16. The method of claim 1, wherein the display is a liquid crystal display.

17. The method of claim 1, wherein the image is a grey-scale non-color image.

18. The method of claim 1, wherein the image is a grey-scale color image.

19. A method for displaying an image on a display with a plurality of pixels, comprising the steps of:
   receiving image data comprised of a series of attenuated and unattenuated subframes;
   attenuating the attenuated subframes by approximately a factor of ½ in relation to the unattenuated subframes;
   storing the image data in a plurality of storage elements; and
   displaying the image data in the plurality of pixels.

20. A method for displaying an image on a display with a plurality of pixels, comprising the steps of:
   receiving image data comprised of a series of attenuated and unattenuated subframes;
   attenuating the attenuated subframes by approximately a factor of $½^m$ in relation to the unattenuated subframes;
   storing the image data in a plurality of storage elements; and
   displaying the image data in the plurality of pixels.

21. A method for displaying an image on a display with a plurality of pixels, comprising the steps of:
   receiving image data to be displayed at a first rate;
   subdividing said image data into bit plane subframes;
   altering said bit plane subframes into new subframes to be displayed; and
   displaying said new subframes in a manner to achieve visual integration, wherein said step of altering said bit plane subframes comprises:
   attenuating intensity of lower significant bit subframes to produce attenuated subframes; and
   combining unattenuated subframes to yield fewer unattenuated subframes.

22. The method of claim 21, wherein said step of attenuating includes attenuating the intensity of lower significant bit subframes by approximately a factor of ½ in relation to the intensity of unattenuated subframes.

23. The method of claim 21, wherein said step of attenuating includes attenuating the intensity of lower significant bit subframes by approximately a factor of $½^m$ in relation to the intensity of unattenuated subframes.

24. The method of claim 21, wherein the display is a liquid crystal display.

25. The method of claim 21, wherein the image is a grey-scale non-color image.

26. The method of claim 21, wherein the image is a grey-scale color image.

27. A method for displaying an image on a display with a plurality of pixels, comprising the steps of:
   receiving image data to be displayed at a first rate;
   subdividing said image data into bit plane subframes;
   altering said bit plane subframes into new subframes to be displayed; and
   displaying said new subframes in a manner to achieve visual integration, wherein said step of altering said bit plane subframes comprises:
   combining higher significant bit plane subframes to yield fewer bit plane subframes having longer duration.

28. The method of claim 27, wherein the display is a liquid crystal display.

29. The method of claim 27, wherein the image is a grey-scale non-color image.

30. The method of claim 27, wherein the image is a grey-scale color image.

* * * * *